(12) United States Patent
Milro et al.

(10) Patent No.: US 9,094,485 B1
(45) Date of Patent: Jul. 28, 2015

(54) REAL-TIME ADJUSTMENT FOR BETTER CALLER EXPERIENCE

(75) Inventors: James Elwood Milro, Omaha, NE (US); Bruce Pollock, Omaha, NE (US)

(73) Assignee: West Corporation, Omaha, NE (US)

( * ) Notice: Subject to any disclaimer, the term of this patent is extended or adjusted under 35 U.S.C. 154(b) by 2038 days.

(21) Appl. No.: 12/028,229

(22) Filed: Feb. 8, 2008

(51) Int. Cl.
 *H04M 1/64* (2006.01)
 *H04M 1/00* (2006.01)

(52) U.S. Cl.
 CPC ...................................... *H04M 1/00* (2013.01)

(58) Field of Classification Search
 CPC .......................... H04M 2201/40; H04M 1/271
 USPC .................... 379/71, 72, 88.17, 88.13, 88.12,
  379/265.12, 265.13, 266.02, 265.06,
  379/265.08, 265.09, 266.07, 266.06, 88.01,
  379/265.03
 See application file for complete search history.

(56) References Cited

U.S. PATENT DOCUMENTS

| | | | | |
|---|---|---|---|---|
| 6,724,887 | B1 * | 4/2004 | Eilbacher et al. | 379/265.03 |
| 6,775,377 | B2 * | 8/2004 | McIllwaine et al. | 379/265.06 |
| 6,922,466 | B1 * | 7/2005 | Peterson et al. | 379/88.09 |
| 6,970,554 | B1 * | 11/2005 | Peterson et al. | 379/266.1 |
| 7,003,079 | B1 * | 2/2006 | McCarthy et al. | 379/32.01 |
| 7,068,774 | B1 * | 6/2006 | Judkins et al. | 379/265.01 |
| 7,809,127 | B2 * | 10/2010 | Hackbarth et al. | 379/265.01 |
| 7,912,193 | B2 * | 3/2011 | Chingon et al. | 379/142.08 |
| 7,917,536 | B2 * | 3/2011 | Lora et al. | 707/802 |
| 7,920,546 | B2 * | 4/2011 | Sylvain | 370/352 |
| 7,930,314 | B2 * | 4/2011 | Gupta | 707/769 |
| 8,401,156 | B1 * | 3/2013 | Milro et al. | 379/88.01 |
| 2005/0232399 | A1 * | 10/2005 | Vos et al. | 379/88.18 |
| 2006/0109975 | A1 * | 5/2006 | Judkins et al. | 379/265.02 |
| 2007/0022000 | A1 * | 1/2007 | Bodart et al. | 705/10 |
| 2009/0060149 | A1 * | 3/2009 | Pavelko et al. | 379/88.17 |
| 2009/0109959 | A1 * | 4/2009 | Elliott et al. | 370/352 |
| 2011/0117878 | A1 * | 5/2011 | Barash et al. | 455/404.2 |

* cited by examiner

Primary Examiner — Simon King

(57) ABSTRACT

A method, a system, and computer readable medium comprising instructions for real time adjustment for better caller experience are provided. The method comprises obtaining caller experience of a call flow, notifying a service provider of the caller experience, receiving at least one corrective action from the service provider, and implementing the at least one corrective action for better caller experience.

26 Claims, 31 Drawing Sheets

| TRAIT | VALUE=1-5 | RED | YELLOW | GREEN | 1 | 2 | 3 | 4 | 5 | | |
|---|---|---|---|---|---|---|---|---|---|---|---|
| NEGATIVE BEHAVIOR | FULL | COMBINED 1X TIMEOUTS AND INVALIDS OVER 15% | COMBINED 1X TIMEOUTS, AND INVALIDS FROM 6-14% | COMBINED 1X TIMEOUTS, AND INVALIDS UNDER 6% | >15% | 12-14% | 9-12% | 6-8% | 0-5% | | |
| CALLER DISCONTENT | FULL | COMBINED FINAL TIMEOUTS, INVALIDS AND INAPPROPRIATE HANG UPS OVER 10% | COMBINED FINAL TIMEOUTS, INVALIDS AND INAPPROPRIATE HANG UPS FROM 6-9% | COMBINED FINAL TIMEOUTS, INVALIDS AND INAPPROPRIATE HANG UPS UNDER 6% | >10% | 9% | 7-8% | 6% | 0-5% | | |
| DIALOGUE AND MENUS | FULL | MISGUIDED—COUNTER PRODCUTIVE DESIGN THAT CONFUSES AND IRRITATES CALLERS | AMBIGUOUS—USES SOME BEST PRACTICES, BUT STILL CONFUSES CALLERS TO THE POINT OF EXHAUSTION | DISTINCT—USES BEST PRACTICES FOR OPTIMAL CUSTOMER SATISFACTION | 1 | 2 | 3 | 4 | 5 | | |
| PREFERENCE 1/2 RATE | HALF | THE AVERAGE OF THE TWO LOWEST MENU SELECTION IS 2% OR LESS | THE AVERAGE OF THE TWO LOWEST MENU SELECTION IS 3-10% | THE AVERAGE OF THE TWO LOWEST MENU SELECTION IS MORE THAN 10% | <2% | 3-4% | 5-6% | 7-9% | >10% | | |
| PERSONA-AUDIO QUALITY 1/2 RATE | HALF | AMATEUR VOICE TALENT AND/OR MULTIPLE VOICES | IMPROPER VOICE TALENT WITH INAPPROPRIATE PERSONA | PROFESSIONAL VOICE TALENT AND APPROPRIATE PERSONA | 1 | 2 | 3 | 4 | 5 | | |

FIG. 4A

| TRAIT | VALUE=1-5 | RED | YELLOW | GREEN | 1 | 2 | 3 | 4 | 5 |
|---|---|---|---|---|---|---|---|---|---|
| NAVIGATION LENGTH 1/2 RATE | HALF | UNNECESSARILY LONG NAVIGATION OVER 3 MINUTES. | UNNECESSARILY LONG NAVIGATION OF 1.5 TO 3 MINUTES. | LESS THAN 1.5 MINUTES. | >3:00 | 2:01-2:59 | 1:31-2:00 | 1:01-1:30 | <1:00 |
| PROMPT LENGTH 1/2 RATE | HALF | UNNECESSARILY LONG NAVIGATION OVER 3 MINUTES. PROMPT MORE THAN 30 SECONDS | UNNECESSARILY LONG NAVIGATION OF 1.5 TO 3 MINUTES. PROMPT MORE THAN 15 SECONDS | LESS THAN 1.5 MINUTES. PROMPT LESS THAN 15 SECONDS | >1:00 | :46-:59 | :31-:45 | :16-:30 | <:15 |

GREEN=95%
YELLOW=76-94%
RED=75%

400

412 — NAVIGATION LENGTH 1/2 RATE
414 — PROMPT LENGTH 1/2 RATE

FIG. 4B

| TRAIT | VALUE = 1-5 | | | 1 | 2 | 3 | 4 | 5 |
|---|---|---|---|---|---|---|---|---|
| NEGATIVE BEHAVIOR | FULL | COMBINED 1X TIMEOUTS, AND INVALIDS | COMBINED 1X TIMEOUTS, AND INVALIDS | COMBINED 1X TIMEOUTS, AND INVALIDS | >20% | 17-19% | 13-16% | 9-12% | 0-8% |
| CALLER DISCONTENT | FULL | COMBINED FINAL TIMEOUTS, INVALIDS AND INAPPROPRIATE HANG UPS. | COMBINED FINAL TIMEOUTS, INVALIDS AND INAPPROPRIATE HANG UPS. | COMBINED FINAL TIMEOUTS, INVALIDS AND INAPPROPRIATE HANG UPS. | >15% | 12-14% | 9-11% | 6-8% | 0-5% |
| RECOGNITION RATE | FULL | VOICE RECOGNITION RATE LESS THAN 70% | VOICE RECOGNITION RATE 71-91% | VOICE RECOGNITION RATE 92% OR GREATER | <70% | 71-77% | 78-84% | 85-91% | >92% |
| OUT OF GRAMMAR | FULL | 20% OR MORE | 10-20% | 10% OR LESS | >20% | 14-19% | 10-13% | 6-9% | 0-5% |
| DIALOGUE AND MENUS | FILL | MISGUIDED-COUNTER PRODUCTIVE PRACTICES | AMBIGUOUS-PARTIAL BEST PRACTICE | DISTINCT-BEST PRACTICE ADHERENCE | 1 | 2 | 3 | 4 | 5 |
| PREFERENCE 1/2 RATE | HALF | 2% AVG. OR LESS FOR LOWEST TWO OPTIONS | 3-10% AVG. FOR LOWEST TWO OPTIONS | 10% AVG. OR MORE FOR LOWEST TWO OPTIONS | <2% | 3-4% | 5-6% | 7-9% | >10% |

FIG. 11A

| | HALF | AMATEUR | IMPROPER | PROFESSIONAL | 1 | 2 | 3 | 4 | 5 |
|---|---|---|---|---|---|---|---|---|---|
| PERSONA-AUDIO QUALITY 1/2 RATE | HALF | | | | | | | | 5 |
| NAVIGATION LENGTH 1/2 RATE | HALF | UNNECESSARILY LONG NAVIGATION OVER 3 MINUTES. | UNNECESSARILY LONG NAVIGATION OVER 1.5 TO 3 MINUTES. | LESS THAN 1.5 MINUTES. | >3:00 | 2:01-2:59 | 1:31-2:00 | 1:01-1:30 | <1:00 |
| PROMPT LENGTH 1/2 RATE | HALF | UNNECESSARILY LONG NAVIGATION OVER 3 MINUTES. PROMPT MORE THAN 30 SECONDS | UNNECESSARILY LONG NAVIGATION OVER 1.5 TO 3 MINUTES. PROMPT MORE THAN 15 SECONDS | LESS THAN 1.5 MINUTES. PROMPT LESS THAN 15 SECONDS | >1:00 | :46-:59 | :31-:45 | :16-:30 | <:15 |

GREEN=90%
YELLOW=66-89%
RED=65%

FIG. 11B

| | PAYMENTS ME | RATING | WEIGHT | PAYMENT EXT | RATING | WEIGHT | BANK DRAFT RE | RATING | WEIGHT |
|---|---|---|---|---|---|---|---|---|---|
| NEGATIVE BEHAVIOR | 40% | 1 | 1.00 | 11% | 4 | 4.00 | 20% | 1 | 1.00 |
| CALLER DISCONTENT | 13% | 2 | 2.00 | 0% | 5 | 5.00 | 4% | 5 | 5.00 |
| RECOGNITION RATES | 90% | 4 | 4.00 | 96% | 5 | 5.00 | NA | NA | 0.00 |
| OUT OF GRAMMAR | 29% | 1 | 1.00 | 8% | 4 | 4.00 | NA | NA | 0.00 |
| DIALOGUE AND MENUS | DISTINCT | 4 | 4.00 | DISTINCT | 5 | 5.00 | DISTRICT | 4 | 4.00 |
| PREFERENCE | 3% | 2 | 2.00 | 22% | 5 | 2.50 | 9% | 4 | 2.50 |
| PERSONA-AUDIO QUALITY | PRO | 5 | 2.50 | PRO | 5 | 2.50 | PRO | 5 | 2.50 |
| NAVIGATION LENGTH | 1:10 | 4 | 2.50 | 1:10 | 4 | 2.00 | 2:00 | 4 | 2.00 |
| PROMPT LENGTH | :15 | 5 | 2.50 | :10 | 5 | 2.50 | 1:00 | 3 | 1.50 |
| | | 28.00 | 21.00 | | 42 | 33 | | 26 | 18 |
| | | | 0.60 | | | 0.93 | | | 0.72 |

FIG. 12A

| TRAIT | PROMPT | | | PROMPT | | | PROMPT | | |
|---|---|---|---|---|---|---|---|---|---|
| | LOCATIONS MENU | RATING | WEIGHT | LOCATE ZIP CODE | RATING | WEIGHT | NOT ELIG. EXTEN | RATING | WEIGHT |
| NEGATIVE BEHAVIOR | 52% | 1 | 1.00 | 17% | 2 | 2.00 | 9% | 4 | 4.00 |
| CALLER DISCONTENT | 32% | 1 | 1.00 | 8% | 4 | 4.00 | 0% | 5 | 5.00 |
| RECOGNITION RATES | NA | NA | 0.00 | NA | 0 | 0.00 | 95% | 5 | 5.00 |
| OUT OF GRAMMAR | NA | NA | 0.00 | NA | 0 | 0.00 | 2% | 5 | 5.00 |
| DIALOGUE AND MENUS | DISTINCT | 5 | 5.00 | DISTINCT | 5 | 5.00 | DISTINCT | 5 | 5.00 |
| PREFERENCE | 35% | 5 | 2.50 | NA | 0 | 0.00 | 3% | 2 | 1.00 |
| PERSONA-AUDIO QUALITY | PRO | 5 | 2.50 | PRO | 5 | 2.50 | PRO | 5 | 2.50 |
| NAVIGATION LENGTH | 1:10 | 4 | 2.00 | 1:20 | 4 | 2.00 | 1:10 | 4 | 2.00 |
| PROMPT LENGTH | :08 | 5 | 2.50 | :05 | 5 | 2.50 | :08 | 5 | 2.50 |
| | | 26.00 | 16.50 | | 25.00 | 18.00 | | 40.00 | 32.00 |
| | | | 0.66 | | | 0.80 | | | 0.91 |

FIG. 12B

REAL-TIME ADJUSTMENT FOR BETTER CALLER EXPERIENCE

CROSS REFERENCE TO RELATED APPLICATIONS

The present application is related to commonly assigned U.S. patent application Ser. No. 12/028,248 entitled REAL-TIME MONITORING OF CALLER EXPERIENCE IN A CALL FLOW, U.S. patent application Ser. No. 12/028,238 entitled REAL-TIME MONITORING OF CALLER EXPERIENCE FOR A GROUP OF STEPS IN A CALL FLOW, filed on even date herewith, the entire contents of which are incorporated by reference herein.

FIELD OF THE DISCLOSURE

The present disclosure relates generally to an automated voice response system. More particularly, the present disclosure provides a method, a system, and a computer readable medium comprising instructions for real-time adjustment for better caller experience in an automated voice response system.

BACKGROUND OF THE DISCLOSURE

Callers who called into one of many automated voice response systems for services have experienced different confusions in navigating through the system. For example, a caller may not have understood a prompt that was provided by the system, and thus, experienced confusion in making a selection. Another example is a caller may have missed an option that was provided in the selection, and thus, became lost in the system. In yet another example, a caller may have experienced a long delay in obtaining data from the system, and thus, hung up before the service was actually provided.

Caller confusions cause delays in providing services, because confused callers are more likely to hang up and retry their calls. In addition, confused callers who are dissatisfied with their services are more likely to terminate their relationships with their service providers. Furthermore, confused callers provide valuable insights in system improvements. For example, the need of confused callers for certain options in the system, the willingness of confused callers to adapt to new options or services introduced in the system, the amount of time confused callers are willing to wait for assistance, etc. Therefore, what is needed is a method and system for providing real-time adjustment for caller experience in an automated voice response system. In this way, service providers may dynamically adjust areas where callers are confused or frustrated in the system in order to provide better caller experience.

SUMMARY OF THE DISCLOSURE

A method for real time adjustment for better caller experience is provided. The method comprises obtaining caller experience of a call flow, notifying a service provider of the caller experience, receiving at least one corrective action from the service provider, and implementing the at least one corrective action for better caller experience.

In one embodiment, to notify the service provider, caller experience of at least one step in a call flow is obtained. Color-coding of the at least one step is determined based on the caller experience. A color-coded call flow is generated based on color-coding of the at least one step. The color-coded call flow is presented to the service provider.

In an alternative embodiment, to notify the service provider, caller experience of at least one step in a call flow is obtained. Color-coded result of the at least one step is determined based on the caller experience. A color-coded Web interface comprising the at least one color-coded result is generated. The color-coded Web interface is presented to the service provider.

In another alternative embodiment, to notify a service provider of the caller experience, caller experience of at least one step in a call flow is obtained. At least one color-coded result is determined based on the caller experience. A voice response comprising the at least one color-coded result is generated. A call to the service provider is initiated. The voice response is sent to the service provider.

In yet another alternative embodiment, to notify a service provider of the caller experience, caller experience of at least one step in a call flow is obtained. At least one color-coded result is determined based on the caller experience. A notification comprising the at least one color-coded result is generated. An internet protocol connection to the service provider is initiated. The notification is sent to the service provider via the internet protocol connection.

BRIEF DESCRIPTION OF THE DRAWINGS

FIG. 4A depicts a diagram illustrating an exemplary monitoring formula in accordance with one embodiment of the present disclosure;

FIG. 4B depicts a diagram illustrating a continuation of an exemplary monitoring formula in accordance with one embodiment of the present disclosure;

FIG. 11A depicts a diagram illustrating an exemplary monitoring formula for a group of steps in accordance with an alternative embodiment of the present disclosure;

FIG. 11B depicts a diagram illustrating a continuation of an exemplary monitoring formula for a group of steps in accordance with an alternative embodiment of the present disclosure;

FIG. 12A depicts a diagram illustrating an exemplary construction of a caller experience for each step of the payments sub-menu call flow in accordance with an alternative embodiment of the present disclosure;

FIG. 12B depicts a diagram illustrating a continuation of an exemplary construction of a caller experience for each step of the payments sub-menu call flow in accordance with an alternative embodiment of the present disclosure;

DETAILED DESCRIPTION OF THE INVENTION

Figure 1:
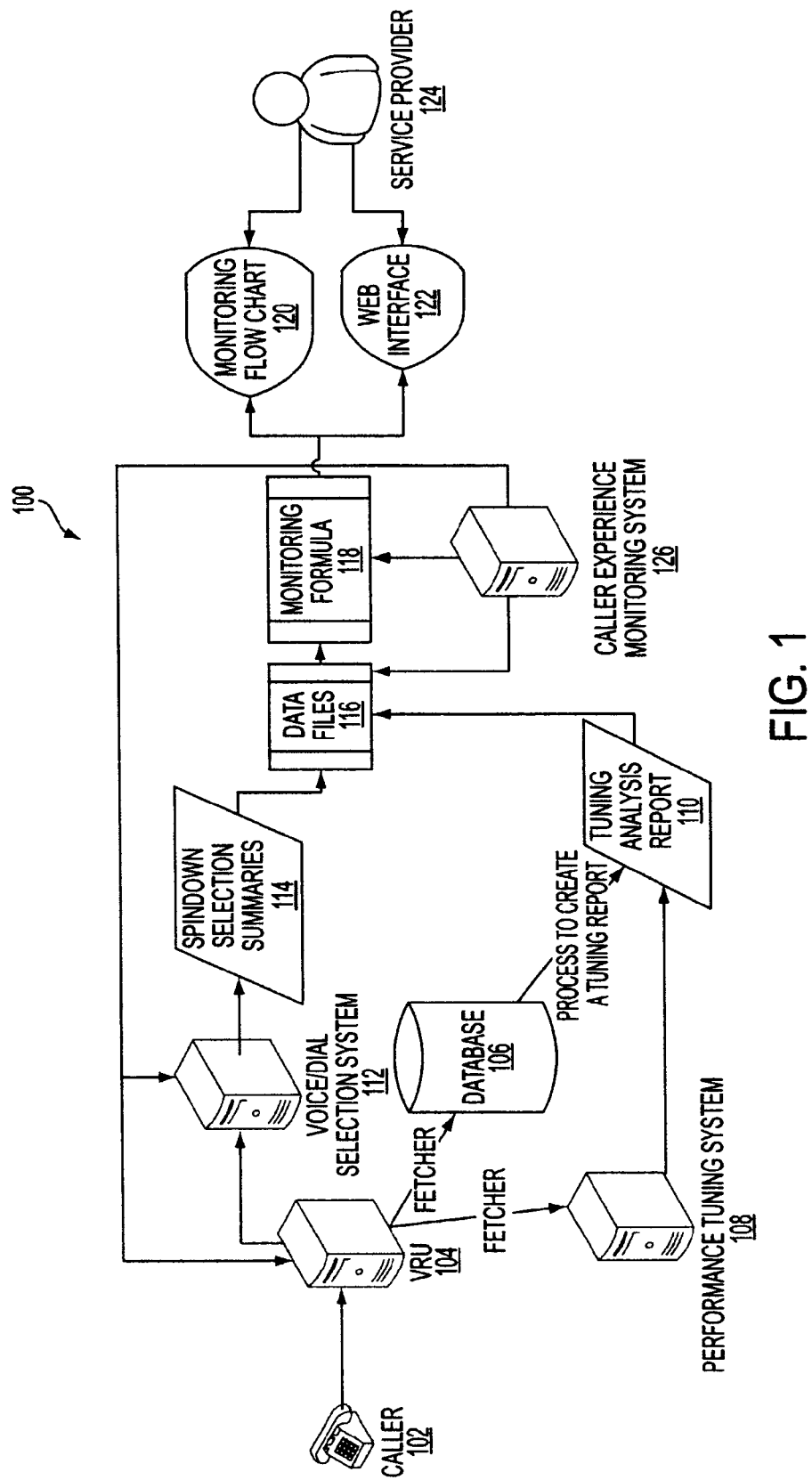
FIG. 1 depicts a diagram of a system for real-time monitoring of caller experience in a call flow in accordance with one embodiment of the present disclosure.

With reference to the figures and in particular with reference to FIG. 1, a diagram of a system for real-time monitoring of caller experience is depicted in accordance with an embodiment of the disclosure. In system 100, caller 102 places a call to voice response system unit 104 via a device, such as a telephone, an Internet Protocol-enabled phone, or a database processing system, such as a computer. Upon receiving the call, voice response system unit 104 guides the caller 102 through a number of options in order to obtain the desired services. The voice response system unit 104 is communicably coupled to a database 106. For each call that the voice response system unit 104 handles, it collects data associated with the call and information about the caller and stores the data and information in database 106. The information may include the amount of time a caller spent on a prompt, the percentage of callers who reached a certain prompt, etc.

The voice response system unit 104 is also communicably coupled to a performance tuning system 106. Performance tuning system 106 monitors performance of voice response system unit 104 for each call. Upon completion of a certain number of calls or upon request, performance tuning system 108 generates a tuning analysis report 110 based on the data and information stored in database 106. The tuning analysis report 110 is used for analysis in improving performance and efficiency of the voice response system unit 104. Systems 104 and 108 may be a data processing system, such as a desktop computer, a laptop computer, a server or any other type of device capable of sending and receive information via a wired or wireless protocol. The transfer of information between system 104, database 106, and performance tuning system 108 may be accomplished via at least one of a wireless protocol, a wired protocol and a combination of a wireless protocol and a wired protocol. The steps performed in this figure are performed by software, hardware, firmware, and/or the combination of software, hardware, and/or firmware.

In addition to database 106 and performance tuning system 108, voice response system unit 104 is also communicably coupled to a voice/dial selection system 112. The voice/dial selection system 112 monitors voice or dial options selected by each caller 102 and generates spindown selection summaries 114. Spindown selection summaries 114 comprise a summary of selections made by each caller 102. The summaries provide useful data for analysis of the overall caller experience. Data from tuning analysis report 110 and spindown selection summaries 114 may then be combined into a number of data files 116 for processing.

Upon combining the data into data files, a caller experience monitoring system 126 then applies a monitoring formula 118 to data in the data files 116 to identify problem areas in caller experience. In one embodiment, monitoring formula 118 utilizes a set of metrics for monitoring caller experience. For example, one set of metrics may comprise seven criteria used to rate each prompt of the call flow. These criteria are applied against the data in data files 116 to generate results for review by the service provider 124. More details about the monitoring formula are discussed with reference to FIGS. 3, 4A, and 4B below. The results may be presented in different formats. In one embodiment, the results may be presented in a monitoring flow chart that is color-coded to show problem areas. In an alternative embodiment, the results may be presented on a Web interface to service providers who may access it via the Internet. In addition to presenting the result to service provider 124, caller experience system 126 may provide helpful feedback to voice/dial selection system 112 to take corrective measures in order to improve the overall caller experience.

Figure 2:
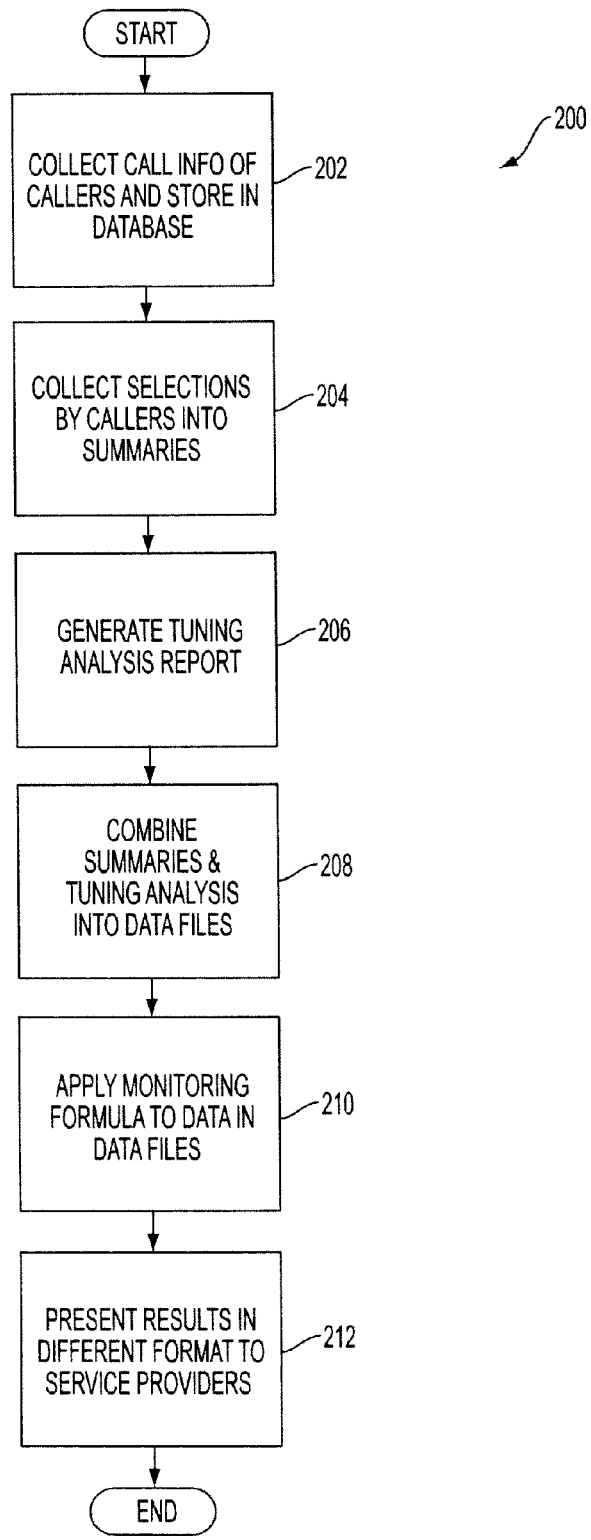
FIG. 2 depicts a flowchart of a process for real-time monitoring of caller experience in a call flow in accordance with one embodiment of the present disclosure.

Referring to FIG. 2, a flowchart of a process for real-time monitoring of caller experience is depicted in accordance with one embodiment of the present disclosure. In this embodiment, process 200 may be implemented as instructions embodied in a computer readable medium executing within caller experience system 126. Process 200 begins at step 202 to collect call information by callers and stores the information into a database 202. Next, process 200 continues to step 204 to collect selections by callers and stores them into spindown selection summaries. The performance tuning system then continues to step 206 to generate a tuning analysis report based on the data and information stored in the database. Upon generating the tuning analysis report, process 200 continues to step 208 to combine data from the tuning analysis report and the spindown selection summaries into a number of data files.

Process 200 then continues to step 210 to apply a monitoring formula to data in the number of data files to generate results for review by service providers. Process 200 then completes at step 212 to present the results in different formats to the service provider, who may then revised their call flow or add new prompts in the call flow to improve the caller experience.

Figure 3:
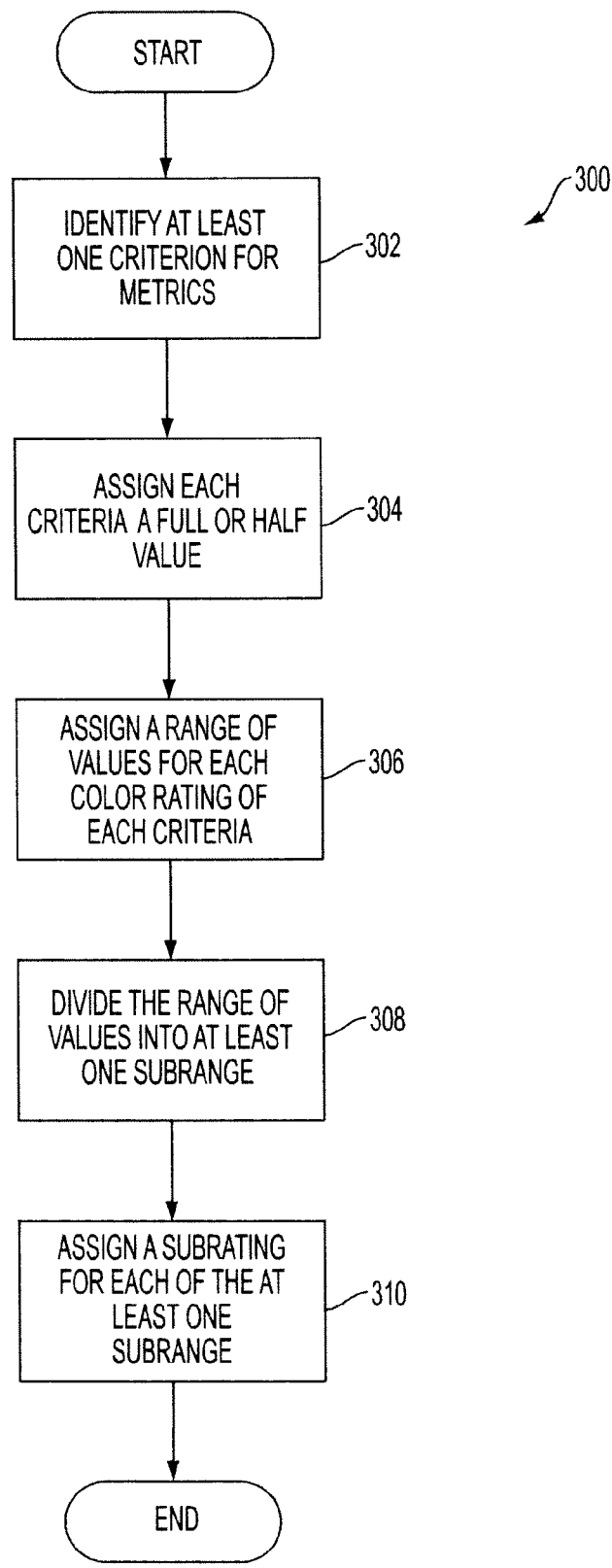
FIG. 3 depicts a flowchart of a process for developing a formula for monitoring caller experience in a call flow in accordance with one embodiment of the present disclosure.

Referring to FIG. 3, a flowchart of a process for developing a formula for monitoring caller experience is depicted in accordance with one embodiment of the present disclosure. In one embodiment, process 300 may be implemented as instructions embodied in a computer readable medium executing within caller experience monitoring system 126. Process 300 begins at step 302 to identify at least one criterion for the set of metrics used to monitor caller experience. The at least one criterion may be inputted into the system by a customer or a service provider.

Next, process 300 continues to step 304 to assign each of the at least one criterion a full or half value. A full value provides a full rating for the criterion, while a half value provides a half rating for the criterion. Process 300 then continues to step 306 to assign a range of values for each color rating of each criteria. For example, for criterion negative behavior, a range of 6% to 14% may be assigned to its yellow rating.

After a range is assigned for each color rating of each criterion, process 300 continues to step 308 to divide the range of values into at least one sub-range. For example, the range of 6% to 14% may be divided into a sub-range of 6% to 8%, a sub-range of 9% to 12%, and a sub-range of 12% to 14%. Process 300 then completes at step 310 to assign a sub-rating for each of the at least one sub-range. For example a sub-rating of 2 may be assigned to the sub-range of 12% to 14%, a sub-rating of 3 may be assigned to the sub-range of 9% to 12%, and a sub-rating of 4 may be assigned to the sub-range of 6% to 8%.

Referring to FIGS. 4A and 4B, diagrams illustrating an exemplary monitoring formula are depicted in accordance with one embodiment of the present disclosure. In this example, monitoring formula comprises a set of metrics 400. In metrics 400 as shown in FIG. 4A, seven criteria are defined to monitor caller experience for each prompt of the call flow. The seven criteria comprise negative behavior 402, caller discontent 404, dialog and menus 406, preference 408, and persona audio quality 410. In addition, as shown in FIG. 4B, the seven criteria comprise navigation length 412 and prompt length 414. The seven criteria determine the overall customer satisfaction of the caller.

Monitoring formula 400 also provides a traffic light like color rating for each dialog state. A green rating 416 means that the caller experienced great customer satisfaction. A yellow rating 418 means that the caller has serious questions about customer satisfaction. The yellow rating 418 notifies the service provider to examine weak areas of the designed call flow and make changes in a timely manner. A red rating 420 means that the caller experience has been seriously impacted. In addition, call flow program efficiency is also impacted and changes to the system are needed immediately.

In this example, the color ratings for each of the seven criteria are defined with different thresholds. For example, negative behavior 402 is examined based on the combined one time timeouts and invalids. The threshold for combined one time timeouts and invalids is set to be fewer than 6% for the green rating, from 6% to 14% for a yellow rating, and over 15% for a red rating. Each of the color ratings is further sub-divided into sub-ratings of 1 to 5. For example, the yellow rating of negative behavior 402 is subdivided into sub-ratings 2 to 4 with rating 2 from 12% to 14%, rating 3 from 9% to 12%, and rating 4 from 6% to 8%. With color ratings and sub-ratings, monitoring formula 400 provides more accurate representation of caller experience. The lower the number of timeouts and invalids, the better the caller experience.

Unlike negative behavior 402, caller discontent 404 is examined based on combined final timeouts, invalids, and inappropriate hangups. The threshold for combined final timeouts, invalids, and inappropriate hangups is set to be fewer than 6% for the green rating, from 6% to 9% for a yellow rating, and over 10% for a red rating. The yellow rating of caller discontent 404 is further subdivided into sub-ratings 2 to 4 with rating 2 of 9%, rating 3 from 7% to 8%, and rating 4 of 6%. Similar to negative behavior, the lower the number of timeouts, invalids, and unwanted hangups, the better the caller experience.

Dialogue and menus 406 are examined based on three categories: misguided, ambiguous, and distinct. Misguided means counterproductive design that confuses and irritates callers. Ambiguous uses some best practices, but still confuses callers to a point of exhaustion. Distinct uses best practices for optimal satisfaction. To achieve distinct quality, dialogues and menus should have low incidence of timeouts and invalids. Thus, the more distinct the use of dialogues and menus, the better the caller experience.

Preferences 408 represent callers' responses when the system requests data, for example, account numbers or don't-knows. Preferences are measured based on the average of the two lower menu selections. The threshold for the average is set to be fewer than 2% for the red rating, from 3% to 10% for a yellow rating, and over 10% for a green rating. The yellow rating of preferences 408 is further subdivided into sub-ratings 2 to 4 with rating 2 from 3% to 4%, rating 3 from 5% to 6%, and rating 4 from 7% to 9%.

Persona-audio quality 410 measures the quality of a persona that is directed for instructional prompting. Because the system uses dynamic concatenation of life-live audio playback of data inputs entered by the callers, a higher quality the persona represents a better caller experience. The quality of the persona is based on whether the persona-audio is an amateur voice and/or multiple voices, an improper voice, or a professional voice. Amateur voice and/or multiple voices are the least consistent with the persona of the service provider and thus receive a red rating. Improper voice receives a yellow rating, because it is less consistent with the persona of the service provider. Professional voice receives a green rating, because it is most consistent with the persona of the service provider.

Referring to FIG. 4B, navigation length 412 measures caller experience based on the length of navigation callers have to go through. The shorter the length of navigation, the better the caller experience. In this example, the threshold for navigation length 412 is set to be greater than 3 minutes for the red rating, from 1.5 minutes to 3 minutes for a yellow rating, and under 1.5 minutes for a green rating. The yellow rating of navigation length 412 is further subdivided into sub-ratings 2 to 4 with rating 2 from 2 minutes to 3 minutes, rating 3 from 1.5 minutes to 2 minutes, and rating 4 from 1 to 1.5 minutes.

Prompt length 414 measures caller experience based on the length of the prompt callers have to go through. The shorter the length of the prompt, the better the caller experience. In this example, the threshold for prompt length 414 is set to be greater than 30 seconds for the red rating, from 15 to 30 seconds for a yellow rating, and under 15 seconds for a green rating. The yellow rating of prompt length 414 is further subdivided into sub-ratings 2 to 4 with rating 2 from 46 to 59 seconds, rating 3 from 31 to 45 seconds, and rating 4 from 16 to 30 seconds.

Based on the seven criteria, an overall caller experience percentage is calculated from monitoring formula 400. In this example, an overall caller experience percentage of 95% or above achieves a green rating and represents great customer satisfaction, because the callers found this prompt helpful. An overall caller experience percentage of 76% to 84% achieves a yellow rating and represents serious questions in customer satisfaction, because the callers are confused. An overall caller experience percentage of 75% or below achieves a red rating and represents serious impact on overall customer satisfaction, because the callers are misguided.

Figure 5:
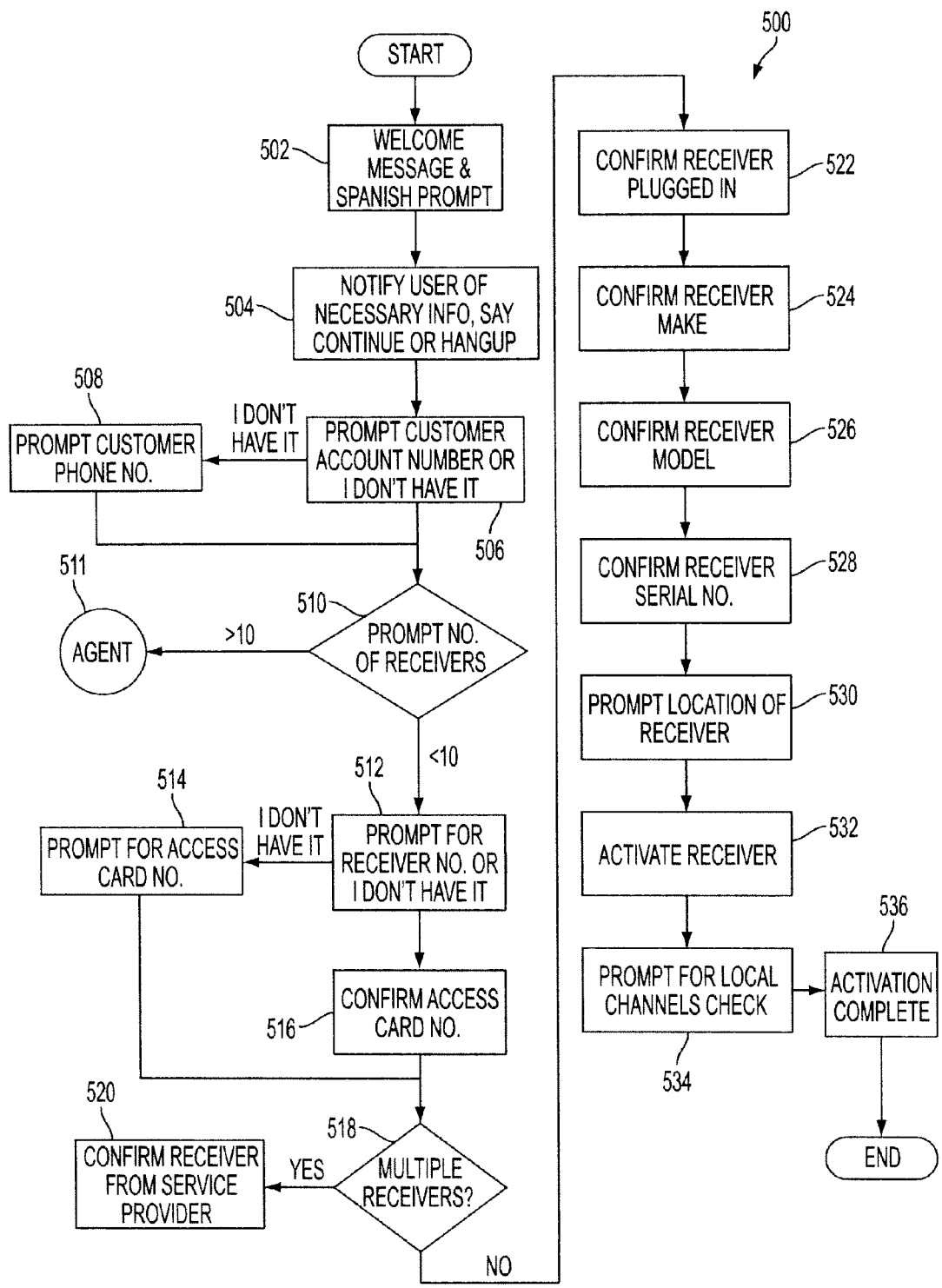
FIG. 5 depicts a flowchart of an exemplary monitoring call flow in accordance with one embodiment of the present disclosure.

Referring to FIG. 5, a flowchart of an exemplary monitoring call flow is depicted in accordance with one embodiment of the present disclosure. Process 500 may be implemented within voice response system, such as voice response system unit 104 when calls are received from callers 102. In this example, process 500 begins at step 502 to provide a welcome message and a prompt for Spanish-speaking customers. Next, process 500 continues to step 504 to notify the user of necessary information, such as account or phone number and a prompt for the user to say "continue" if the user has the necessary information or hangup if the user does not have the necessary information.

Process 500 then continues to step 506 to prompt the user for a customer account number or to say "I don't have it" if the user does not have the customer account number. If the user says "I don't have it", process 500 continues to step 508 to prompt the user for the customer phone number. If the user enters a customer account number or phone number, process 500 continues to step 510 to prompt the number of receivers. If the user enters more than ten receivers, process 500 continues to forward the call to an agent 511. If the user enters ten or less receivers, process 500 continues to step 512 to prompt the user for a receiver number or to say "I don't have it" if the user does not have the receiver number.

If the user enters a receiver number, process 500 continues to step 516 to prompt the user to confirm the access card number. If the user says "I don't have it", process 500 continues to step 514 to prompt for an access card number, process 500 continues to step 518 to prompt the user for multiple receivers. If the user has multiple receivers, process 500 continues to step 520 to prompt the user to confirm that the receiver is from the service provider. If the user does not have multiple receivers, process 500 continues to step 522 to prompt the user to confirm that the receiver is plugged in. Process 500 then continues to step 524 to confirm the make of the receiver, to step 526 to confirm the model of the receiver, and to step 528 to confirm the serial number of the receiver. Process 500 then continues to step 530 to prompt the user for the location of the receiver and to step 532 to activate the located receiver. After the receiver is activated, process 500 continues to step 534 to prompt the user for local channels check. If the user confirms that local channels are received, process 500 terminates at step 536 to notify the user that activation is complete.

Figure 6:
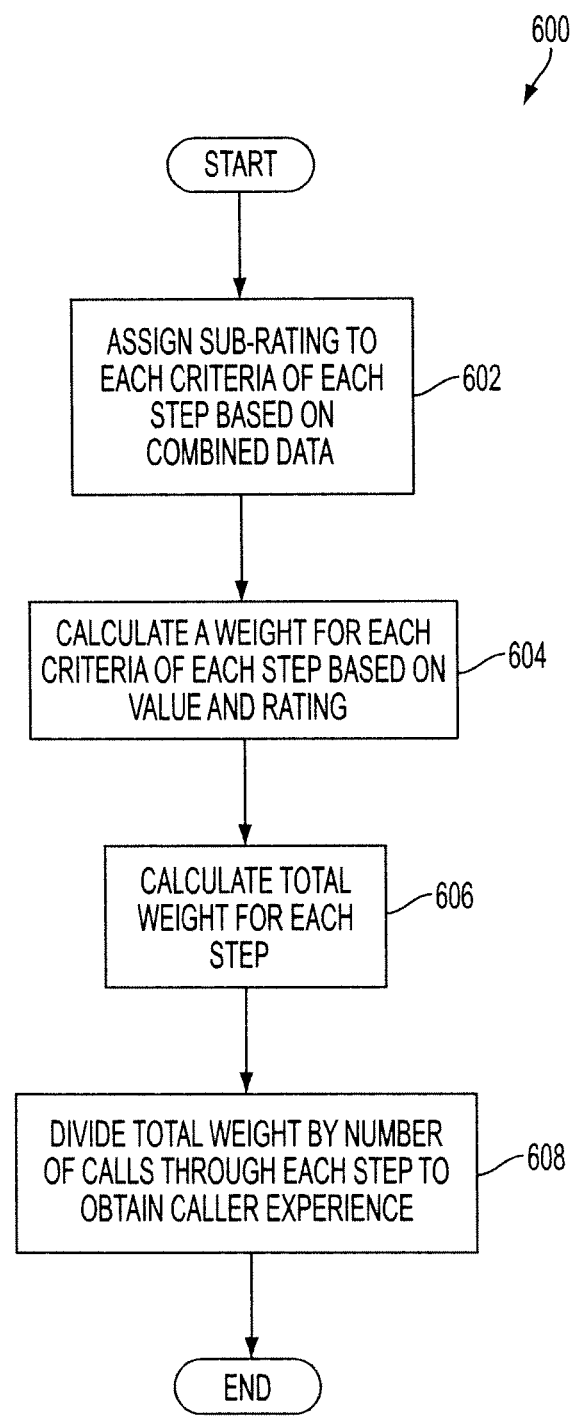
FIG. 6 depicts a flowchart of a process for developing a caller experience rating for each step of a call flow in accordance with one embodiment of the present disclosure.

After a monitoring call flow process is provided, caller experience monitoring system 126 may construct a caller experience for each step of the call flow. Referring to FIG. 6, a flowchart of a process for developing a caller experience rating for each step of a call flow is depicted in accordance with one embodiment of the present disclosure. In one embodiment, process 600 may be implemented as instructions embodied in a computer readable medium executing within caller experience monitoring system 126.

Process 600 begins at step 602 to assign a sub-rating to each criteria of each step based on the combined data in the data files. The sub-rating may be assigned based on the range of values assigned to each sub-range. Next, process 600 continues to step 604 to calculate a weight for each criterion of each step based on previously-assigned value for the criterion and the assigned sub-rating from step 602. Process 600 then continues to step 606 to calculate a total weight for each step. The total weight may be obtained by adding all the weights calculated in step 604. Process 600 then completes at step 608 to divide the total weight calculated in step 606 by the number of calls that were processed through each step. For example, if 20 calls were processed through the welcome message call step, the total weight is divided by 20.

Figure 7:
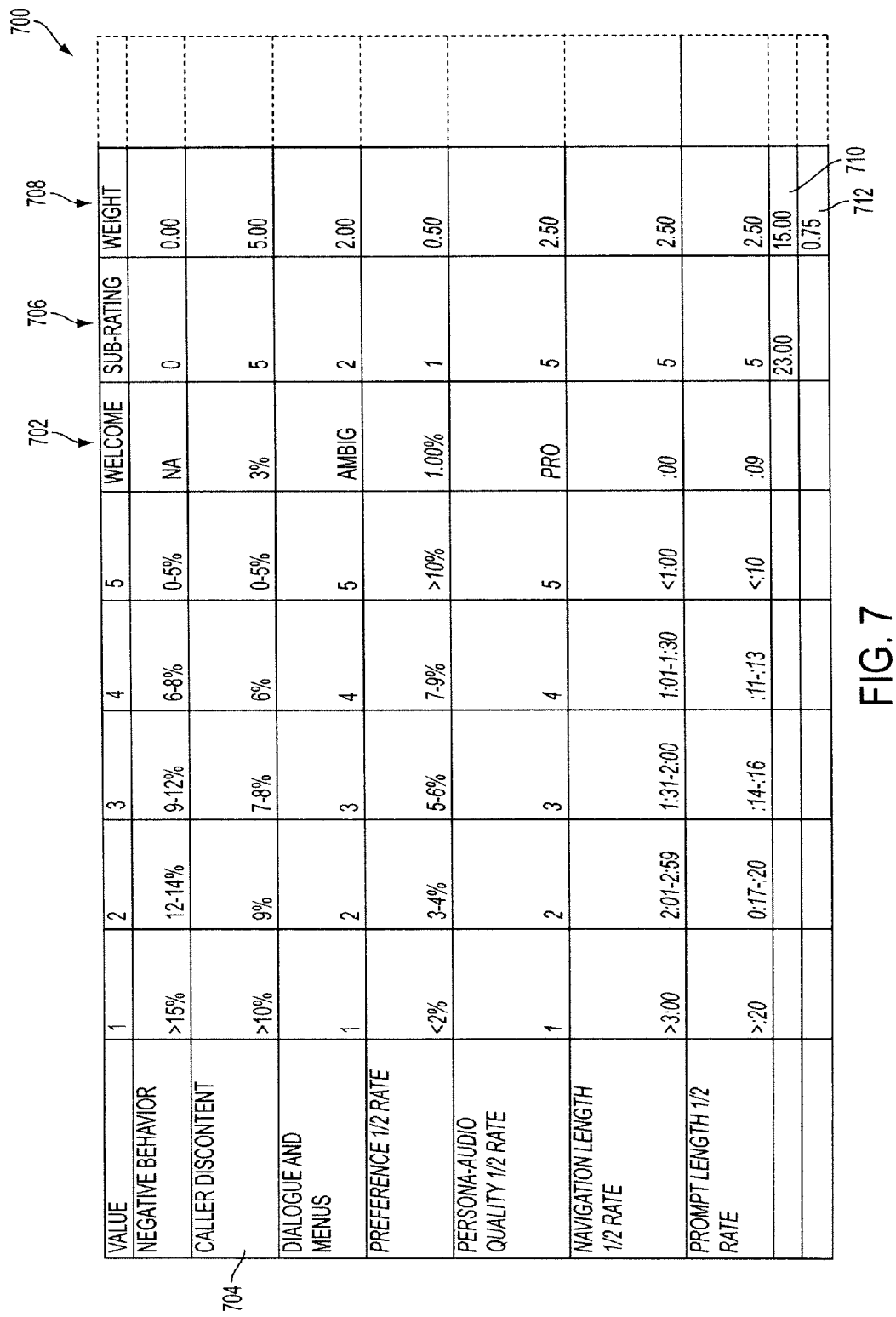
FIG. 7 depicts a diagram illustrating an exemplary construction of a caller experience for each step of the call flow in accordance with one embodiment of the present disclosure.

Referring to FIG. 7, a diagram illustrating an exemplary construction of a caller experience for each step of the call flow is depicted in accordance with one embodiment of the present disclosure. In metrics 700, the combined data for each criteria of call flow step "welcome message" is listed under column 702. For example, the combined data for criteria "caller discontent" is 3%. A sub-rating 706 is assigned for this criteria based on the range of values assigned to each sub-range. In this example, a sub-rating of 5 is assigned for the criteria "caller discontent" for a sub-rating ranging from 0 to 5. Because the combined data of 3% falls within this sub-rating, a sub-rating of 5 is assigned to this criterion.

After the sub-rating is assigned, a weight 708 is calculated for criteria based on the previously-assigned value for each criteria and the sub-rating. In this example, a weight of 5 is calculated for criteria "caller discontent" based on the full value that was previously assigned for this criteria and the sub-rating of 5. If a half value is assigned for this criterion, a sub-rating of 2.5 is calculated. After a weight is calculated for each criterion, a total weight is calculated by adding all the calculated weights. In this example, the total weight of call flow step "welcome message" is 15. Once the total weight is obtained, a caller experience for this step is obtained by dividing the total weight by the number of calls that were processed through this call flow step. In this example, the number of calls that were processed through this step is 20. Therefore, the total weight of 15 is divided by 20 to obtain a caller experience of 0.75. Based on the caller experience of this step, a color rating may be assigned to this call flow step and an overall caller experience may be developed.

Figure 8:
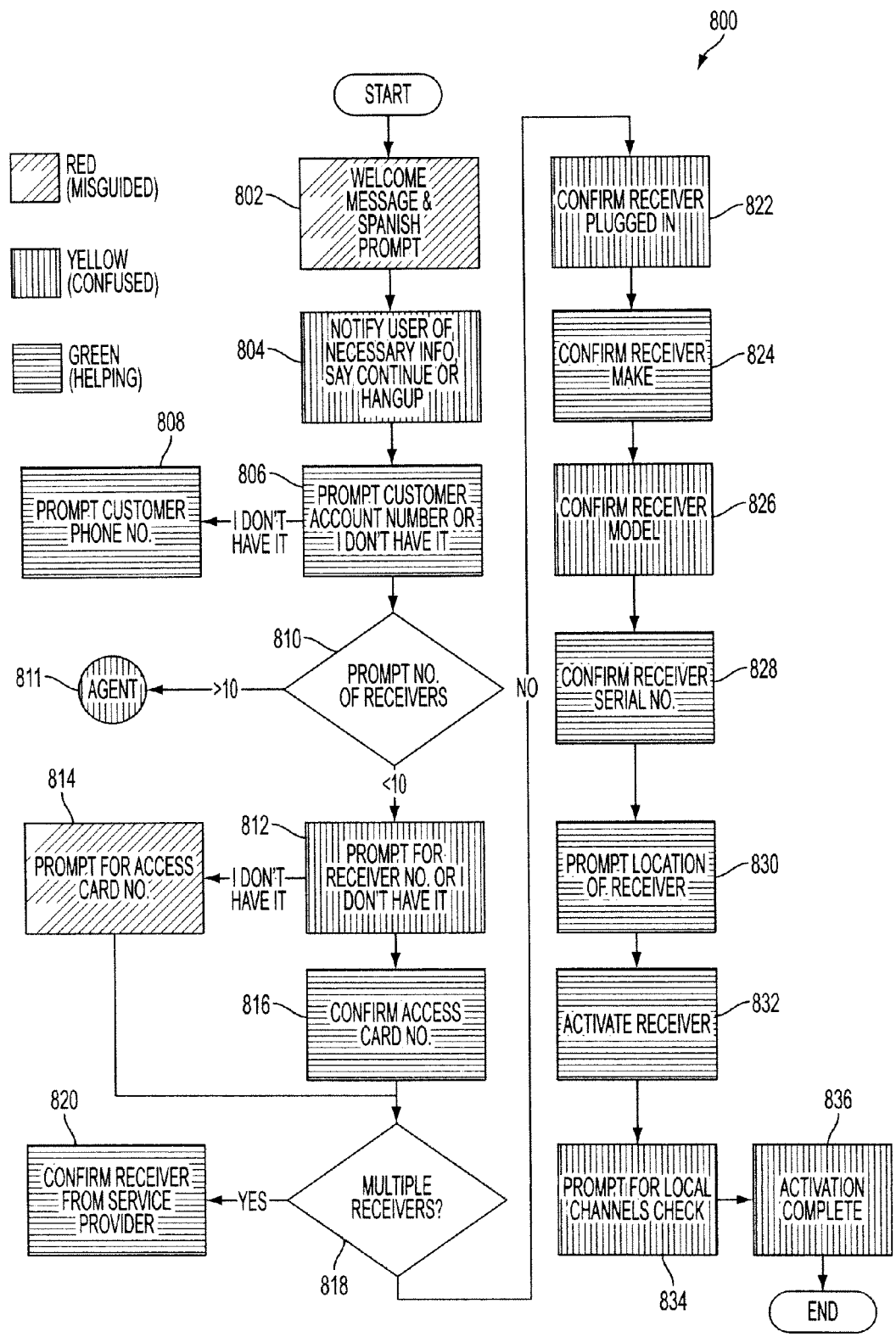
FIG. 8 depicts a diagram illustrating an exemplary color-coded monitoring flow chart in accordance with one embodiment of the present disclosure.

As discussed above, the result of caller experience may be presented to service providers in many formats. In one embodiment, the result may be presented in a monitoring flow chart that is color-coded to show problem areas. Referring to FIG. 8, a diagram illustrating an exemplary color-coded monitoring flow chart is depicted in accordance with one embodiment of the present disclosure. Each step in process 800 is color-coded based on the caller experience obtained using process 600 in FIG. 6. For example, if the caller experience is greater than 0.95, the step is green color-coded. If the caller experience is from 0.76 to 0.94, the step is yellow color-coded. If the caller experience is less than 0.75, the step is red color-coded.

In FIG. 8, red color-coding is represented by crosshairs. Red color-coding means that the caller is misguided. Yellow color-coding is represented by vertical lines. Yellow color-coding means that the caller is confused. Green color-coding is represented by horizontal lines. Green color-coding means that the call flow step is helping the caller. In addition to red, yellow, and green color-codings, other indications may be implemented to represent different level of caller experience without departing the spirit and scope of the present disclosure. For example, an orange color-coding may be implemented to represent a caller experience that is more than confusing but less than misguiding the caller.

In this example, steps 802 and 814 are red color-coded, which means that these steps misguided the callers. These steps seriously impact caller experience and program effectiveness, and thus, need correction immediately. Steps 804, 812, 822, 826, 834, and 836 are yellow color-coded, which means that these steps confused the callers. These steps raise serious questions on customer satisfaction. These steps also identify weak areas that require correction in a timely manner. Steps 806, 808, 816, 820, 824, 828, 830, and 832 are green color-coded, which means that these steps are helping the callers. These steps provide great customer satisfaction and do not require modification.

Based on these color-codings, service providers may conduct focus groups to identify corrective actions to increase program effectiveness and efficiencies. For example, service providers may redesign the dialogue or options of weak steps to increase usage by callers. The new dialogue may then be implemented in the voice response system 104 and the new option may be implemented in the voice/dial selection system 112. Once new dialogue or option is implemented, process 200 may be repeated to monitor caller experience of the improved program.

Figure 9:
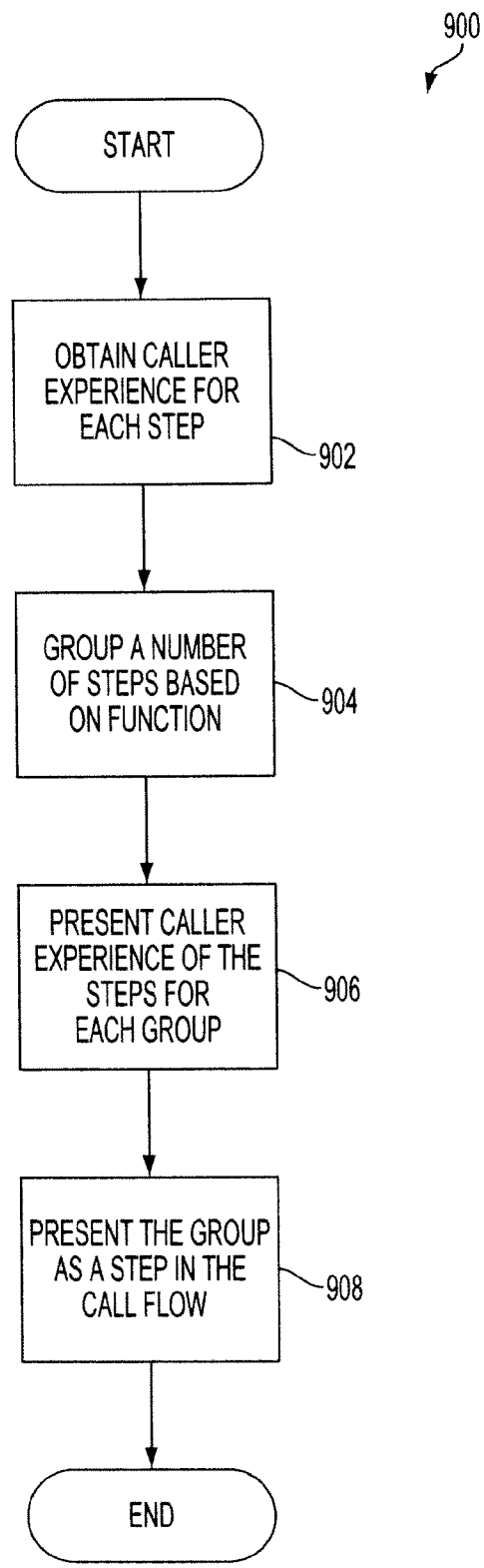
FIG. 9 depicts a flowchart of a process for monitoring caller experience of a group of steps in a call flow in accordance with one embodiment of the present disclosure.

In addition to analyzing and presenting the caller experience for each step of the call flow, an aspect of the present disclosure analyzes aggregated steps of a call flow based on their functions and presents caller experience for the aggregated steps to the service providers. Referring to FIG. 9, a flowchart of a process for monitoring caller experience of a group of steps in a call flow is depicted in accordance with one embodiment of the present disclosure.

In one embodiment, process 900 may be implemented as instructions embodied in a computer readable medium executing within caller experience monitoring system 126. Process 900 begins at step 902 to obtain the caller experience for each step of a call flow. The caller experience may be obtained using process 600 in FIG. 6. Next, process 900 continues to step 904 to group a number of steps in the call flow based on their functions. For example, a new service step, a transfer step, and a disconnect step may be grouped to perform a service update function. Process 900 then continues to step 906 to present the caller experience of the steps in each group based on their function to the service provider. Process 900 then completes at step 908 to present the group as a step in the overall call flow. In one embodiment, the caller experience of the steps is presented at a different level than the level in which the group is presented. For example, the caller experience of the service update steps is presented at a lower level than the level in which the group service update is presented.

Figure 10A:
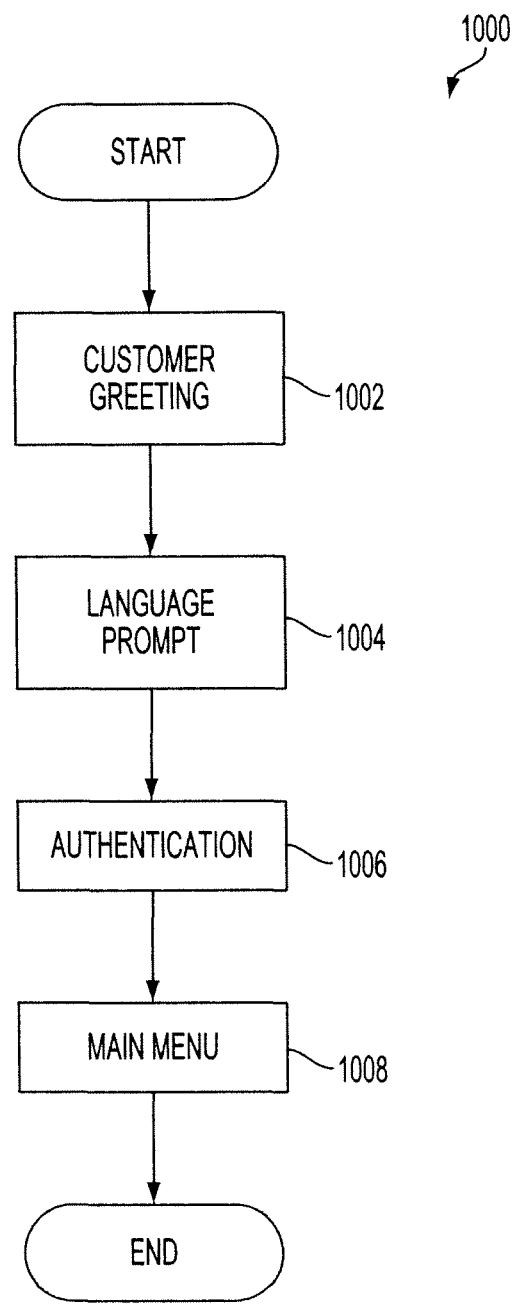
FIG. 10A depicts a diagram of an exemplary monitoring call flow in accordance with an alternative embodiment of the present disclosure.

Referring to FIG. 10A, a diagram of an exemplary monitoring call flow is depicted in accordance with an alternative embodiment of the present disclosure. Process 1000 may be implemented within voice response system, such as voice response system unit 104 when calls are received from callers 102. In this example, process 1000 begins at step 1002 to provide customer greeting to the caller. Next, process 1000 continues to step 1004 to prompt the caller for a preferred language. Process 1000 then continues to step 1006 to authenticate the caller based on an account number provided by the caller. If the caller is authenticated, process 1000 completes at step 1008 to provide a main menu to the caller.

Figure 10B:
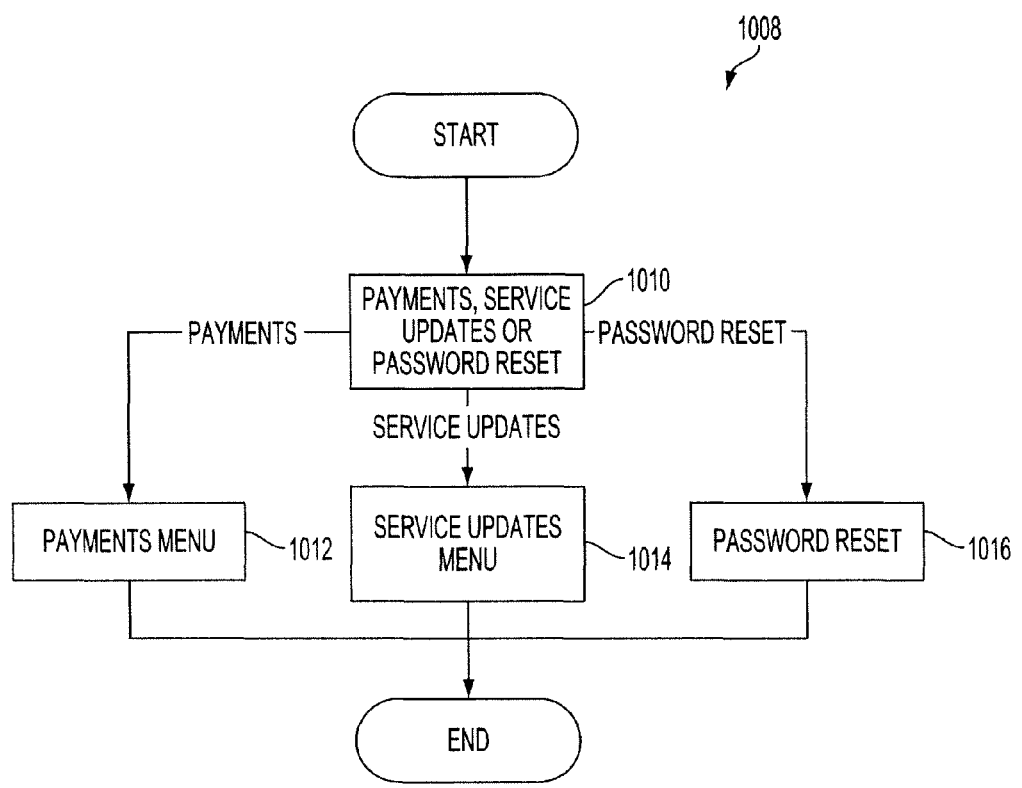
FIG. 10B depicts a diagram of an exemplary main menu call flow in accordance with an alternative embodiment of the present disclosure.

Referring to FIG. 10B, a diagram of an exemplary main menu call flow is depicted in accordance with an alternative embodiment of the present disclosure. Process 1008 may be implemented within voice response system, such as voice response system unit 104 when calls are received from callers 102. In this example, process 1008 begins at step 1010 to prompt the caller to select payments, service updates, or password resets. If the caller selects payments, process 1008 continues to step 1012 to provide the payments menu to the caller. If the caller selects service updates, process 1008 continues to step 1014 to provide a service updates menu to the caller. If the caller selects password resets, process 1008 continues to step 1016 to provide password resets to the caller.

Figure 10C:
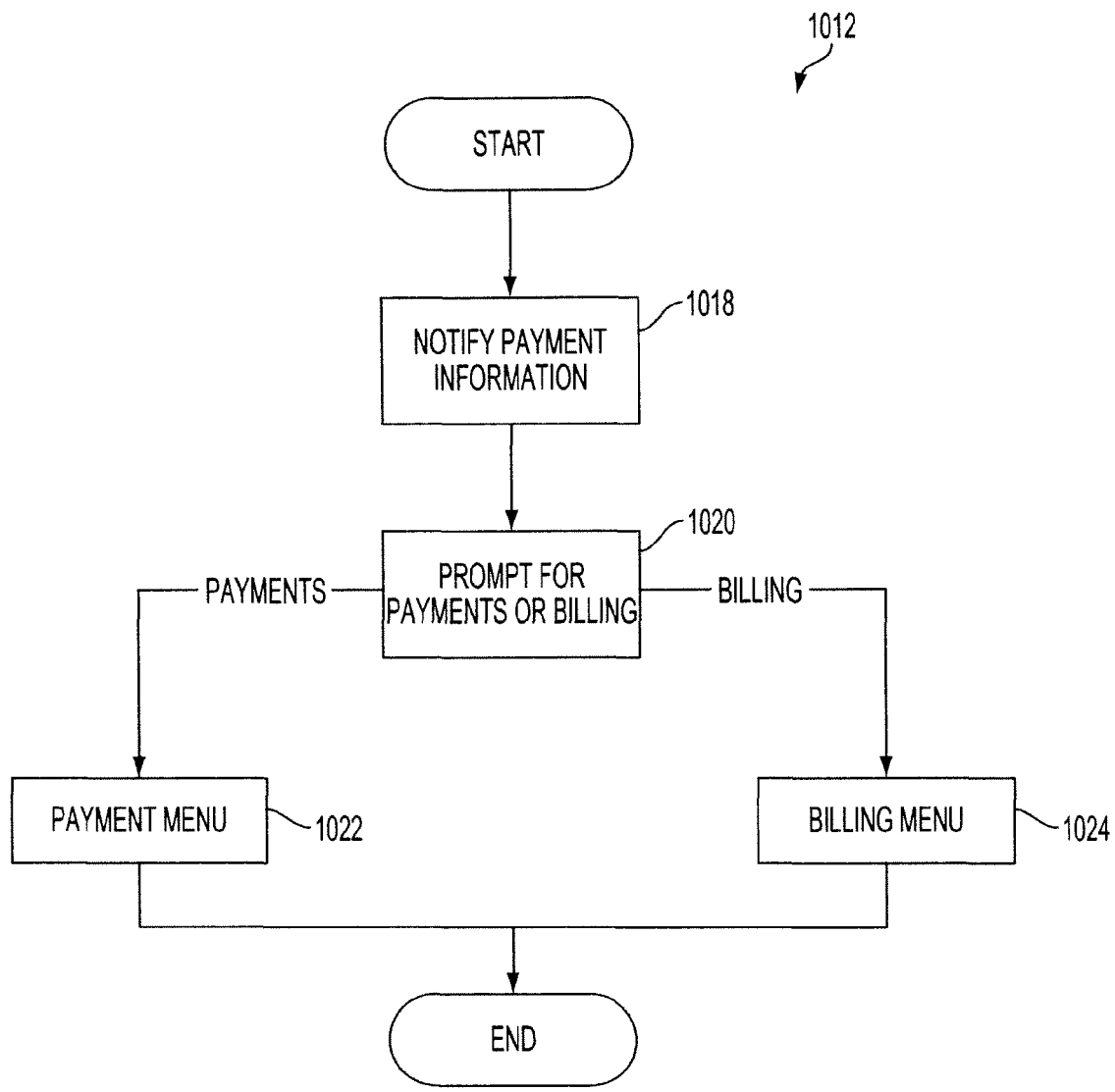
FIG. 10C depicts a diagram of an exemplary payments menu call flow in accordance with an alternative embodiment of the present disclosure.

Referring to FIG. 10C, a diagram of an exemplary payments menu call flow is depicted in accordance with an alternative embodiment of the present disclosure. Process 1012 may be implemented within voice response system, such as voice response system unit 104 when calls are received from callers 102. In this example, process 1012 begins at step 1018 to notify the caller of payment information, such as account balance, due date, last payment date, and the like. Process 1012 then continues to step 1020 to prompt the caller to select either payments or billing. If the caller selects payments, process 1012 continues to step 1022 to provide a payment sub-menu to the caller. If the caller selects billing, process 1012 continues to step 1024 to provide a billing menu to the caller.

Figure 10D:
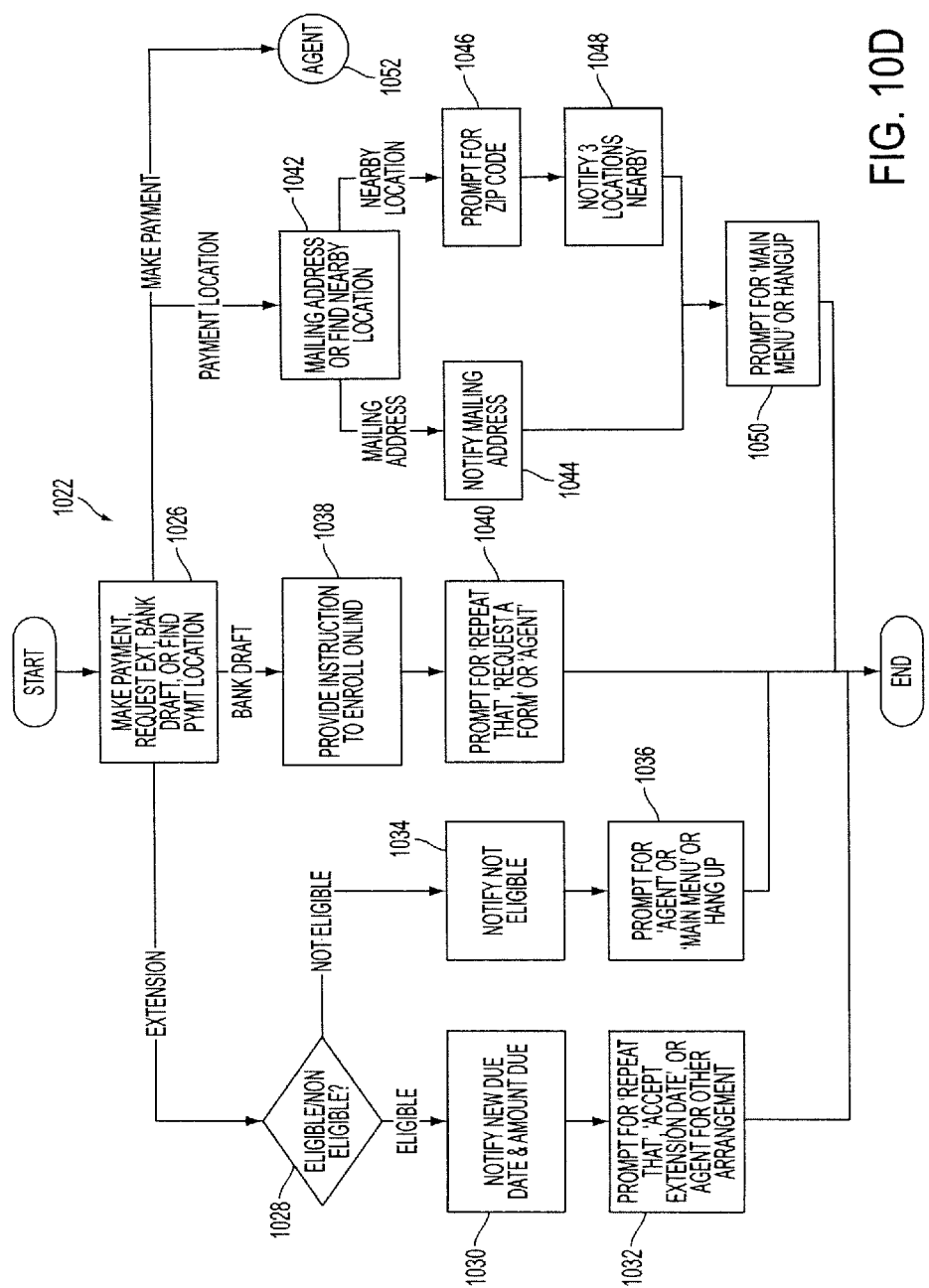
FIG. 10D depicts a diagram of an exemplary payment sub-menu call flow in accordance with an alternative embodiment of the present disclosure.

Referring to FIG. 10D, a diagram of an exemplary payments sub-menu call flow is depicted in accordance with an alternative embodiment of the present disclosure. Process 1022 may be implemented within voice response system, such as voice response system unit 104 when calls are received from callers 102. If the caller selects payments, process 1022 begins at step 1026 to prompt the caller to select making a payment, request extension, sign up for bank draft, or find a payment location.

If the caller selects request extension, process 1022 continues to step 1028 to determine whether or not the caller is eligible for extension. If the caller is eligible, process 1022 continues to step 1030 to notify the caller of new due date and the amount due. Process 1022 continues to step 1032 to prompt the caller to select "repeat that", "accept extension date", or an agent to make other arrangements.

If the caller is not eligible for extension, process 1022 continues to step 1034 to notify the caller that extension is not eligible. Process 1022 then continues to step 1036 to prompt the caller to select an agent to make other arrangements, "main menu", or simply hang up.

If at step 1026 the caller selects sign up for bank draft, process 1022 continues to step 1038 to provide instructions on how to enroll online. Process 1022 then continues to step 1040 to prompt the caller to select "repeat that", "request a form" or an agent to make other arrangements.

If at step 1026 the caller selects find a payment location, process 1022 continues to step 1042 to prompt the caller to select a mailing address for payment or to find nearby location. If the caller selects mailing address, process 1022 continues to step 1044 to notify the caller of the mailing address.

If the caller selects finding nearby location, process 1022 continues to step 1046 to prompt the caller to enter a zip code. Once the caller enters a zip code, process 1022 continues to step 1048 to notify the caller of the nearest three locations. Process 1022 then continues to step 1050 to prompt the caller to select "main menu" or simply hang up.

If at step 1026 the caller selects making a payment, process 1022 continues to step 1052 to connect the caller with an agent to make payment arrangements.

Figure 10E:
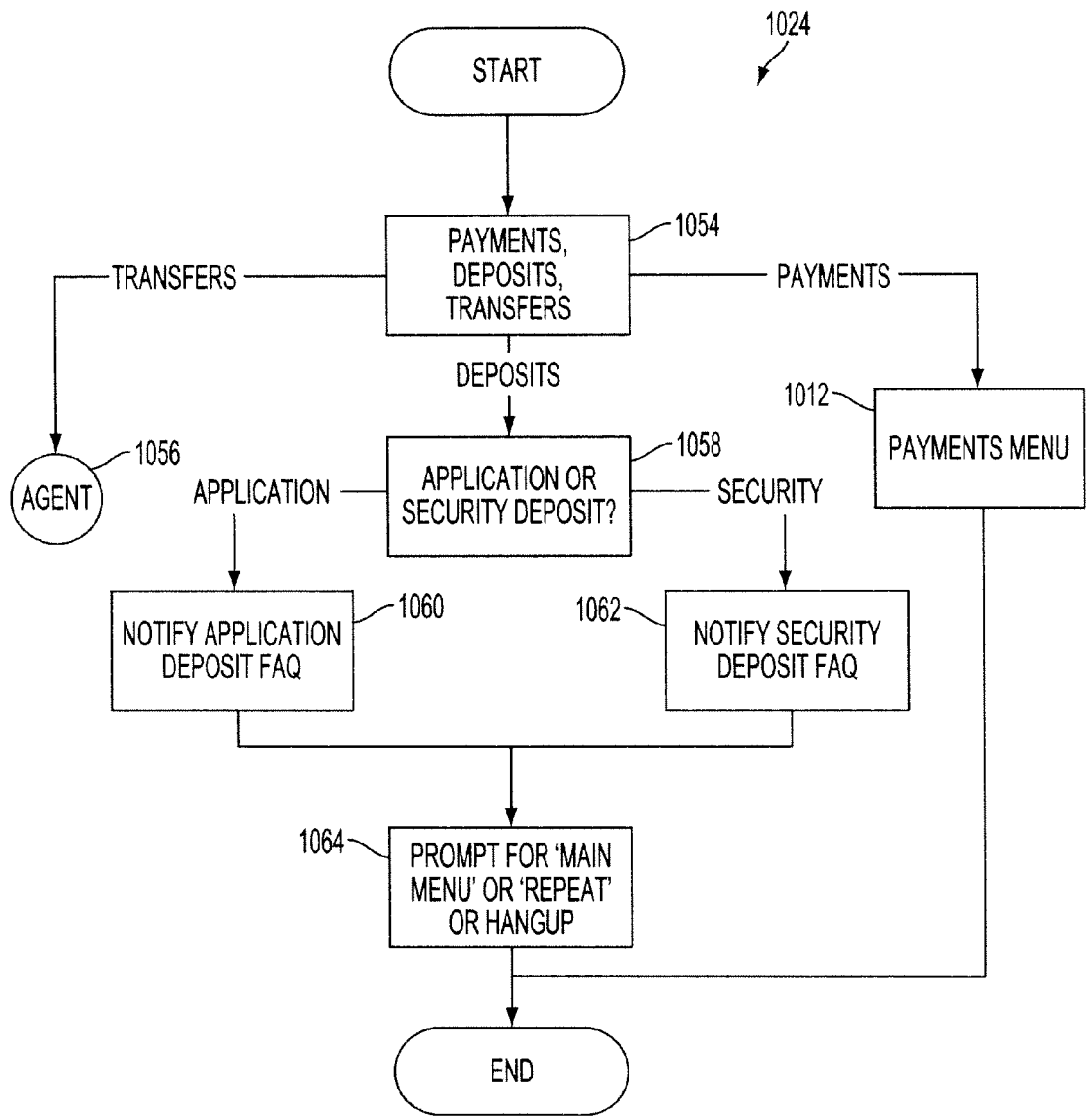
FIG. 10E depicts a diagram of an exemplary billing menu call flow in accordance with an alternative embodiment of the present disclosure.

Referring to FIG. 10E, a diagram of an exemplary billing menu call flow is depicted in accordance with an alternative embodiment of the present disclosure. Process 1024 may be implemented within voice response system, such as voice response system unit 104 when calls are received from callers 102. If the caller selects billing, process 1024 begins at step 1054 to prompt the caller to select making payments, deposits, or transfers.

If the caller selects transfers, process 1024 continues to step 1056 to connect the caller with an agent to make a transfer. If the caller selects payments, process 1024 returns to step 1012 to provide the caller with a payment menu. If the caller selects deposits, process 1024 continues to step 1058 to prompt the caller to select whether the caller wants to make an application or security deposit. If the caller selects application deposit, process 1024 continues to step 1060 to notify the caller of application deposit frequent asked questions (FAQ). If the caller selects security deposit, process 1024 continues to step 1062 to notify the caller of security deposit frequent asked questions (FAQ). Process 1024 then completes at step 1064 to prompt the caller for "main menu", "repeat" or simply hang up.

Figure 10F:
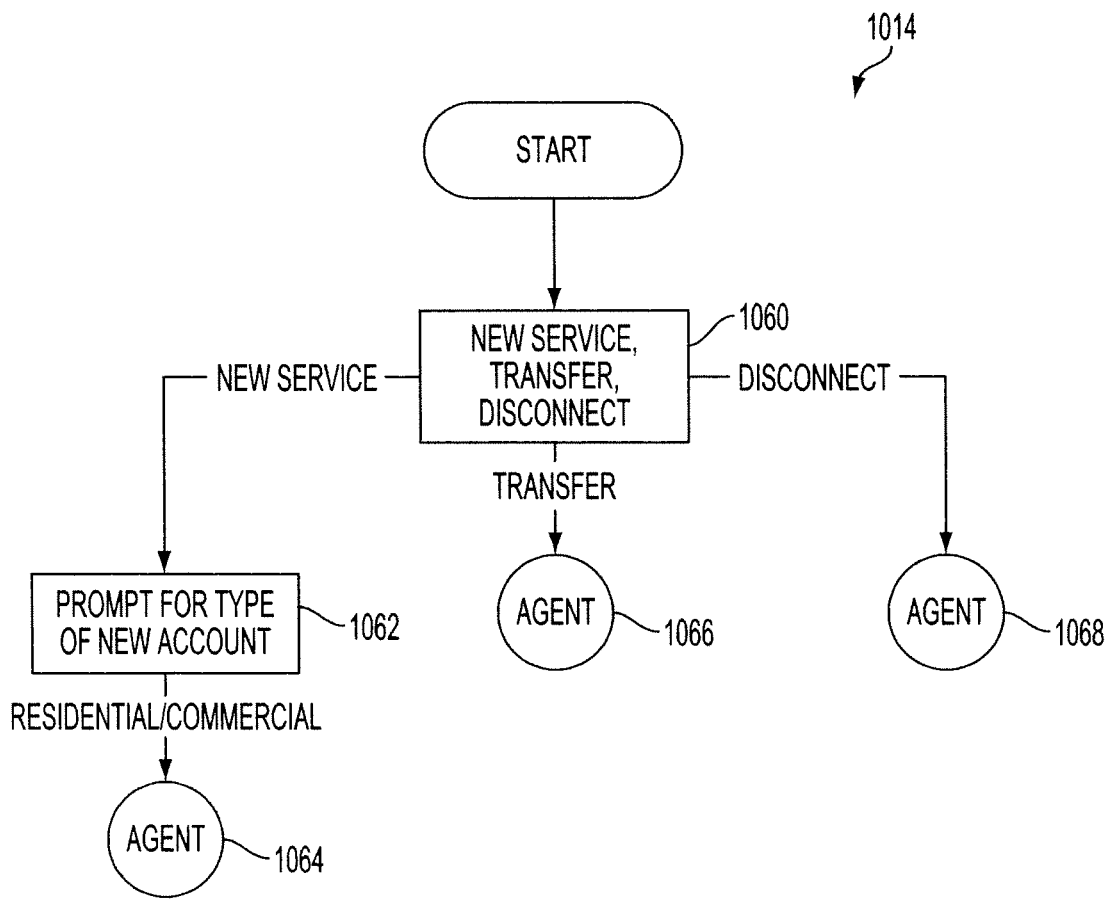
FIG. 10F depicts a diagram of an exemplary service updates menu call flow in accordance with an alternative embodiment of the present disclosure.

Referring to FIG. 10F, a diagram of an exemplary service updates menu call flow is depicted in accordance with an alternative embodiment of the present disclosure. Process 1014 may be implemented within voice response system, such as voice response system unit 104 when calls are received from callers 102. If the caller selects billing, process 1014 begins at step 1060 to prompt the caller to select new service, transfer service, or disconnect service.

If the caller selects new service, process 1014 continues to step 1062 to prompt the caller for the type of new account. If the caller selects either residential or commercial account, process 1014 continues to step 1064 to connect the caller with an agent. If the callers selects either transfer service or disconnect service, process 1014 continues to steps 1066 and 1068 to connect the caller with an agent for such services.

Referring to FIGS. 11A and 11B, diagrams illustrating an exemplary monitoring formula for a group of steps are depicted in accordance with an alternative embodiment of the present disclosure. In this example, monitoring formula comprises a set of metrics 1100. In metrics 1100 as shown in FIGS. 11A and 11B, nine criteria are defined to monitor caller experience for each step of the call flow. Similar to metrics 400 in FIG. 4A, the nine criteria comprise negative behavior 1102, caller discontent 1104, dialog and menus 1106, preference 1108. As shown in FIG. 11B, the nine criteria also comprise persona audio quality 1110, navigation length 1112, and prompt length 1114. In addition, the nine criteria comprises two new criteria as shown in FIG. 11A, recognition rate 1116 and out of grammar 1118.

Recognition rate 1116 is examined based on the rate of voice recognition. The range for voice recognition rate is set to be greater than 92% for the green rating, from 71% to 91% for a yellow rating, and less than 70% for a red rating. The yellow rating of recognition rate 1116 is further subdivided into sub-ratings 2 to 4 with rating 2 ranging from 71% to 77%, rating 3 ranging from 78% to 84%, and rating 4 ranging from 85% to 91%. The higher the voice recognition rate, the better the caller experience.

Out of grammar 1118 is examined based on the percentage out of grammar utterances. The threshold for out of grammar 1118 is set to be 10% or less out of grammar utterances for the green rating, from 10% to 20% for a yellow rating, and greater than 20% for a red rating. The yellow rating of out of grammar 1118 is further subdivided into sub-ratings 2 to 4 with rating 2 ranging from 14% to 19%, rating 3 ranging from 10% to 13%, and rating 4 ranging from 6% to 9%. The lower the percentage out of grammar utterances, the better the caller experience.

Based on the nine criteria, an overall caller experience percentage is calculated from monitoring formula 1100. In this example, an overall caller experience percentage of 90% or above achieves a green rating and represents great customer satisfaction, because the callers found this prompt helpful. An overall caller experience percentage of 66% to 89% achieves a yellow rating and represents serious questions in customer satisfaction, because the callers are confused. An overall caller experience percentage of 65% or below achieves a red rating and represents serious impact on overall customer satisfaction, because the callers are misguided.

Referring to FIGS. 12A and 12B, diagrams illustrating an exemplary construction of a caller experience for each step of the payments sub-menu call flow is depicted in accordance with an alternative embodiment of the present disclosure. In metrics 1200, the combined data for each criteria of payment sub-menu call flow step "payment menu" is listed under column 1202. For example, the combined data for criteria "negative behavior" is 40%. A sub-rating 1204 is assigned for this criteria based on the range of values assigned to each sub-range. In this example, a sub-rating of 1 is assigned for the criteria "negative behavior" for a sub-rating ranging from 0 to 5. Because the combined data of 40% falls within this sub-rating, a sub-rating of 1 is assigned to this criterion.

After the sub-rating is assigned, a weight 1206 is calculated for criteria based on the previously-assigned value for each criteria and the sub-rating. In this example, a weight of 1 is calculated for negative behavior based on the full value that was previously assigned for this criterion and the sub-rating of 1. If a half value is assigned for this criterion, a sub-rating of 0.5 is calculated. After a weight is calculated for each criterion, a total weight is calculated by totaling all the calculated weights. In this example, the total weight of call flow step "payments menu" is 21. Once the total weight is obtained, a caller experience for this step is obtained by dividing the total weight by the number of calls that were processed through this call flow step. In this example, the number of calls that were processed through this step is 35. Therefore, the total weight of 21 is divided by 35 to obtain a caller experience of 0.6. Based on the caller experience of this step, a color rating may be assigned to this call flow step and an overall caller experience may be developed.

After the caller experience for each step of the payment sub-menu is determined, a number of steps for the payments sub-menus is grouped and the caller experience of these steps are presented for the group as a whole. As discussed above, in addition to displaying the caller experience of the steps of a call flow to service providers, aspects of the present disclosure is capable of displaying the caller experience of a group of steps to service providers based on their functions.

Figure 13:
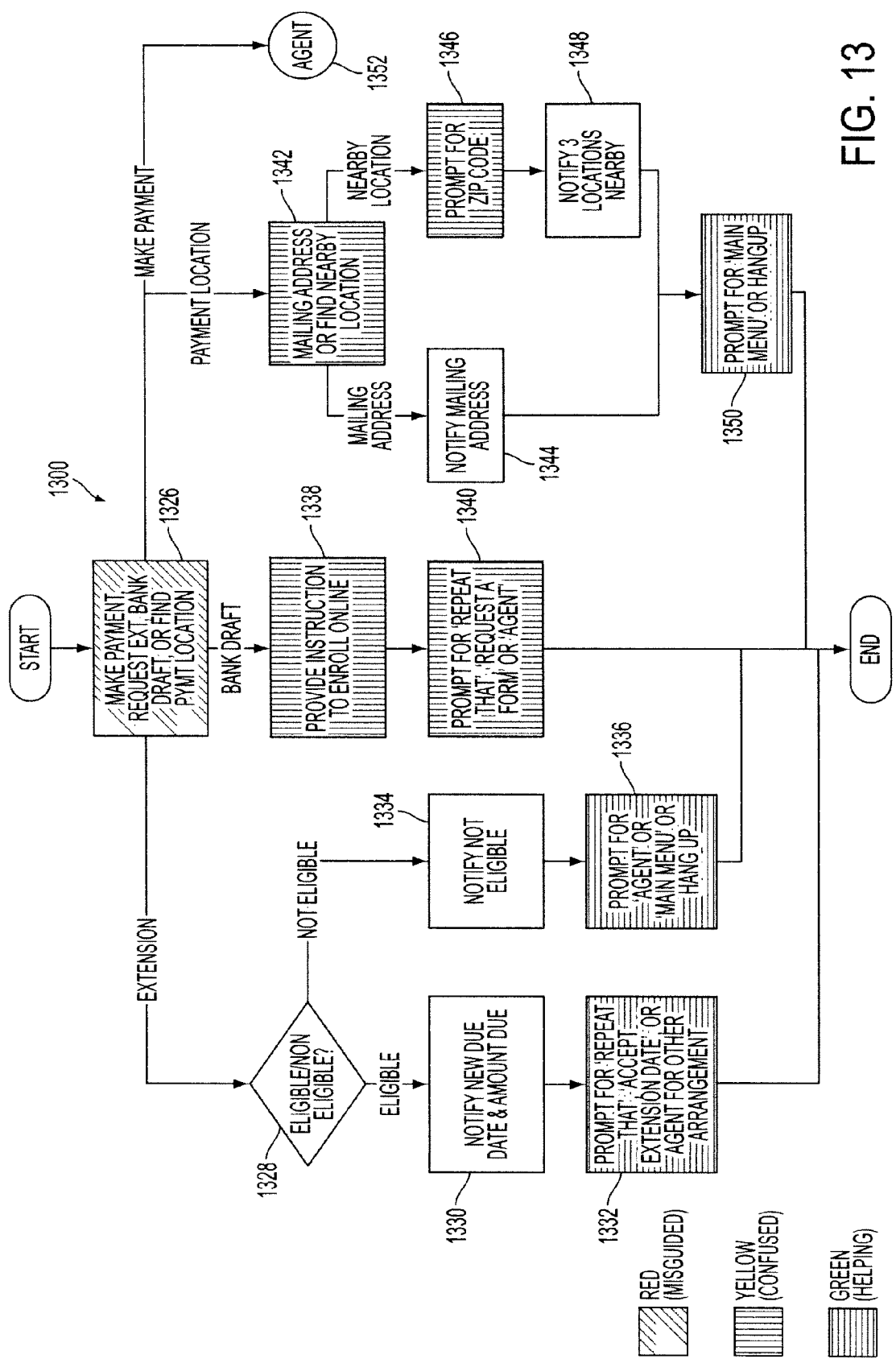
FIG. 13 depicts a diagram illustrating an exemplary color-coded payment sub-menu flow chart in accordance with one embodiment of the present disclosure.

Referring to FIG. 13, a diagram illustrating an exemplary color-coded payment sub-menu flow chart is depicted in accordance with one embodiment of the present disclosure.

Each step in process 1300 is color-coded based on the caller experience obtained using process 600 in FIG. 6. For example, if the caller experience is greater than 90%, the step is green color-coded. If the caller experience is from 66% to 89%, the step is yellow color-coded. If the caller experience is less than 65%, the step is red color-coded.

In FIG. 13, red color-coding is represented by crosshairs. Red color-coding means that the caller is misguided. Yellow color-coding is represented by vertical lines. Yellow color-coding means that the caller is confused. Green color-coding is represented by horizontal lines. Green color-coding means that the call flow step is helping the caller. In addition to red, yellow, and green color-codings, other indications may be implemented to represent different level of caller experience without departing the spirit and scope of the present disclosure. For example, an orange color-coding may be implemented to represent a caller experience that is more than confusing but less than misguiding the caller.

In this example, step 1326 is red color-coded, which means that this step misguided the callers and seriously impact caller experience and program effectiveness. Thus, it needs correction immediately. Steps 1338, 1340, 1342, and 1346 are yellow color-coded, which means that these steps confused the callers. These steps raise serious questions on customer satisfaction. These steps also identify weak areas that require correction in a timely manner. Steps 1332, 1336, and 1350 are green color-coded, which means that these steps are helping the callers. These steps provide great customer satisfaction and do not require modification.

By providing color-codings of a group of steps based on their functions, service providers may monitor caller experience at any level of the call flow and make corrections to only certain groups of steps as they see necessary. In this way, service providers may monitor and adjust to part or whole call flow based on their need. In addition, by identifying the specific groups of steps that present problems, service providers may update design of only those steps instead of the entire call flow. This helps service providers in improving program efficiency and effectiveness by reducing down time.

In addition to analyzing a group of steps based on their function and displaying the caller experience for those steps as a group, an aspect of the present disclosures provides the ability to determine the overall caller experience for a group of steps and present the overall caller experience of the group as a step in the overall call flow.

Figure 14:
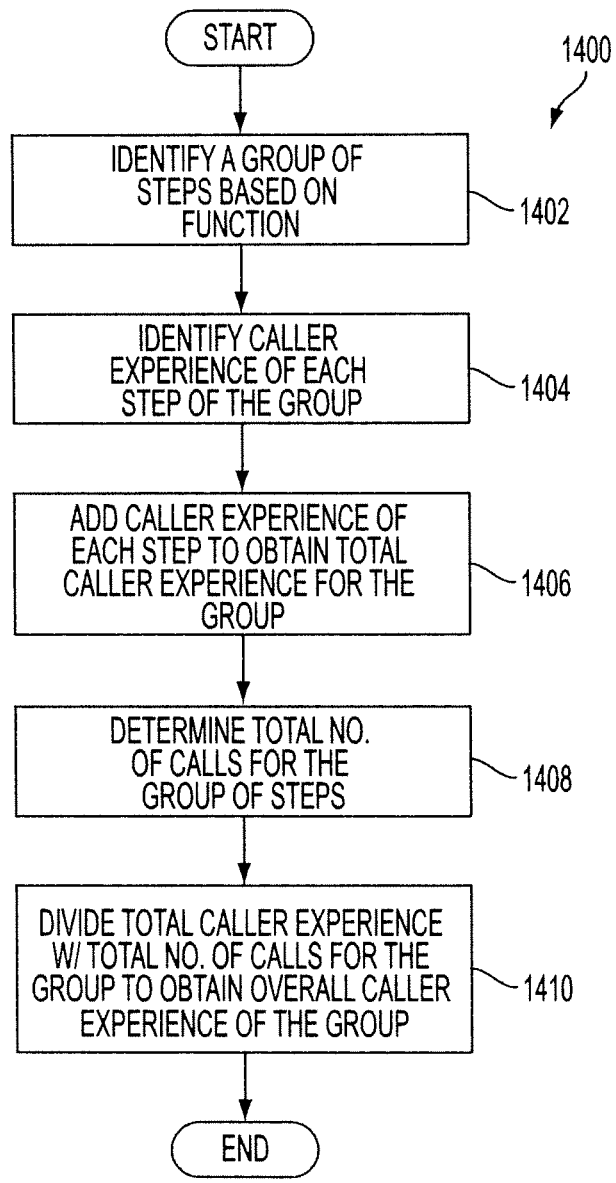
FIG. 14 depicts a flow chart of a process for determining overall caller experience of a group of steps in accordance with one embodiment of the present disclosure.

Referring to FIG. 14, a flow chart of a process for determining overall caller experience of a group of steps is depicted in accordance with one embodiment of the present disclosure. In one embodiment, process 1400 may be implemented as instructions embodied in a computer readable medium executing within caller experience monitoring system 126. Process 1400 begins at step 1402 to identify a group of steps based on their functions, for example, a group of steps that perform payment functions. Next, process 1400 continues to step 1404 to identify caller experience of each step in the group. The caller experience of each step may be identified using process 600 as described FIG. 6. Process 1400 then continues to step 1406 to add caller experience of each step of the group to obtain a total caller experience for the whole group. For example, the weight of each step in FIGS. 12A and 12B may be added to obtain a total caller experience for the payment sub-menu. Returning to FIG. 12A, the weight of call flow step "payment menu" is 21 while the weight of call flow step "bank draft return" is 18. Thus, the total caller experience is 39.

After a total caller experience is obtained, process 1400 continues to step 1408 to determine a total number of calls that were processed by the group as a whole. For example, referring to FIG. 12A, call flow step "payment menu" has processed 35 calls while call flow step "bank draft return" has processed 25 calls. The total number of calls processed by the group if the group only consists of these two steps is 60.

Process 1400 then completes at step 1410 to divide the total caller experience by the total number of calls processed by the steps. Continuing with the above example, the total caller experience 39 is divided by the total number of calls 60 and an overall total caller experience of 65% is obtained.

Based on the color-codings as specified in metrics 110 in FIG. 11B, a red color-coding is assigned to a total caller experience of less than 65%. As a result, an aspect of the present disclosure presents the total caller experience of the group as a color-coded step in the overall call flow.

Figure 15:
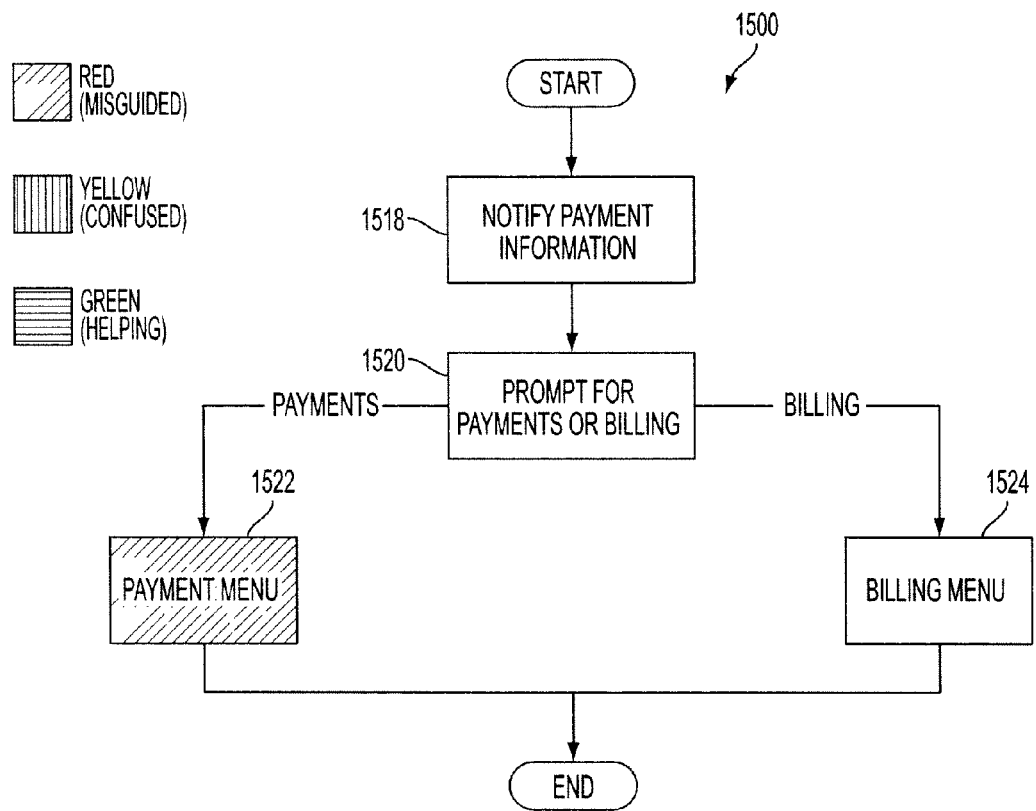
FIG. 15 depicts a diagram illustrating an exemplary color-coded payment menu flow chart in accordance with one embodiment of the present disclosure.

Referring to FIG. 15, a diagram illustrating an exemplary color-coded payment menu flow chart is depicted in accordance with one embodiment of the present disclosure. Because the total caller experience for the payment sub-menu is red color-coded, payment menu 1522 is red color-coded (represented by crosshairs) in process 1500, which means that this step misguided the callers and seriously impacted caller experience and program effectiveness. Thus, it needs correction immediately. By providing the total caller experience of a group and presenting the total caller experience as a step in the overall call flow, service providers may identify problem areas early in the call flow and make appropriate correction to the group. In addition, service providers may isolate certain steps of a group and perform analysis of those steps to determine their effect on the total caller experience. In this way, program effectiveness and efficiency may be improved without affecting operations of the overall call flow.

In addition to providing analysis and present result of caller experience of each step in a call flow and a group of steps based on their functions, an aspect of the present disclosure provides the ability to notify the service providers of problem areas, receive corrective actions from the service providers, and implement the corrective actions in the voice/dial selection system 112 and the voice response system 104.

Figure 16:
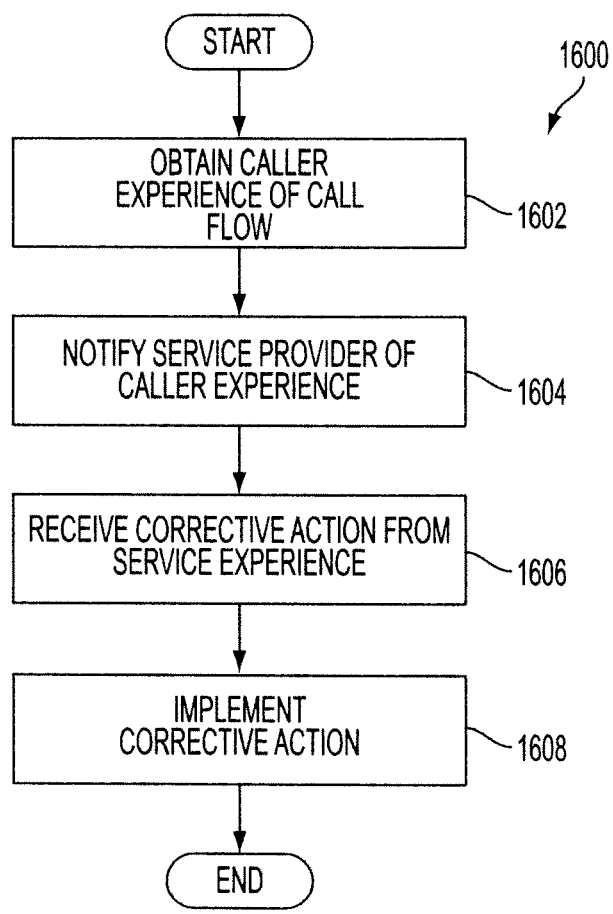
FIG. 16 depicts a flowchart of a process for real time adjustment for better caller experience in accordance with one embodiment of the present disclosure.

Referring to FIG. 16, a flowchart of a process for real time adjustment for better caller experience is depicted in accordance with one embodiment of the present disclosure. In one embodiment, process 1600 may be implemented as instructions embodied in a computer readable medium executing within caller experience monitoring system 126. Process 1600 begins at step 1602 to obtain caller experience of a call flow. Process 1602 may be performed using process 600 as described in FIG. 6 above.

Next, process 1600 continues to step 1604 to notify the service provider of the caller experience. More details regarding manners in which service providers are notified are discussed with reference to FIGS. 17 to 20 below. Process 1600 then continues to step 1606 to receive corrective actions initiated from the service providers in response to the notification sent in step 1604. More details regarding receiving corrective actions are discussed with reference to FIG. 21 below. Upon receiving corrective actions, process 1600 completes at step 1608 to implement the corrective actions. More details regarding the corrective actions are discussed with reference to FIGS. 22 and 23 below.

Figure 17:
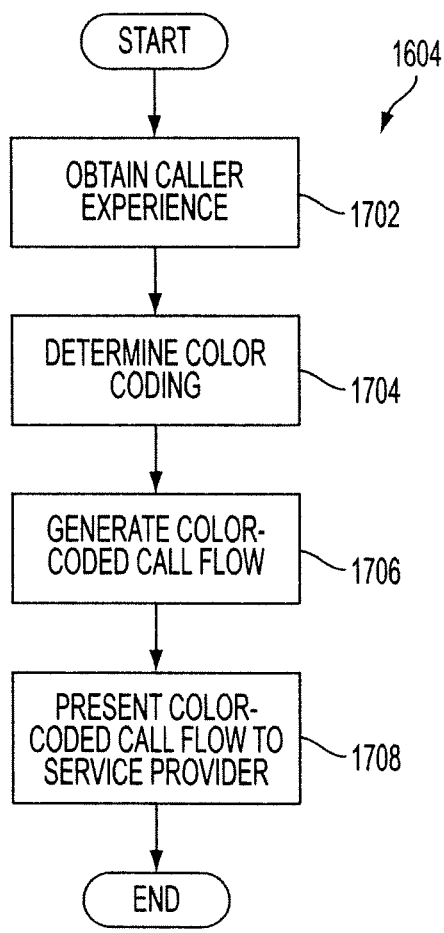
FIG. 17 depicts a flowchart of a process for notifying the service provider of caller experience in accordance with one embodiment of the present disclosure.

Referring to FIG. 17, a flowchart of a process for notifying the service provider of caller experience is depicted in accordance with one embodiment of the present disclosure. In one embodiment, process 1604 may be implemented as instructions embodied in a computer readable medium executing within caller experience monitoring system 126. Process

1604 begins at step 1702 to obtain the caller experience developed using process 600 in FIG. 6.

Next, process 1604 continues to step 1704 to determine the color-codings based on the caller experience. Process 1604 then continues to step 1706 to generate a color-coded call flow based on the color-codings. Process 1604 then completes at step 1708 to present the color-coded call flow to the service provider. FIGS. 8, 13, and 15 illustrate examples of color-coded call flow generated from the caller experience.

Figure 18:
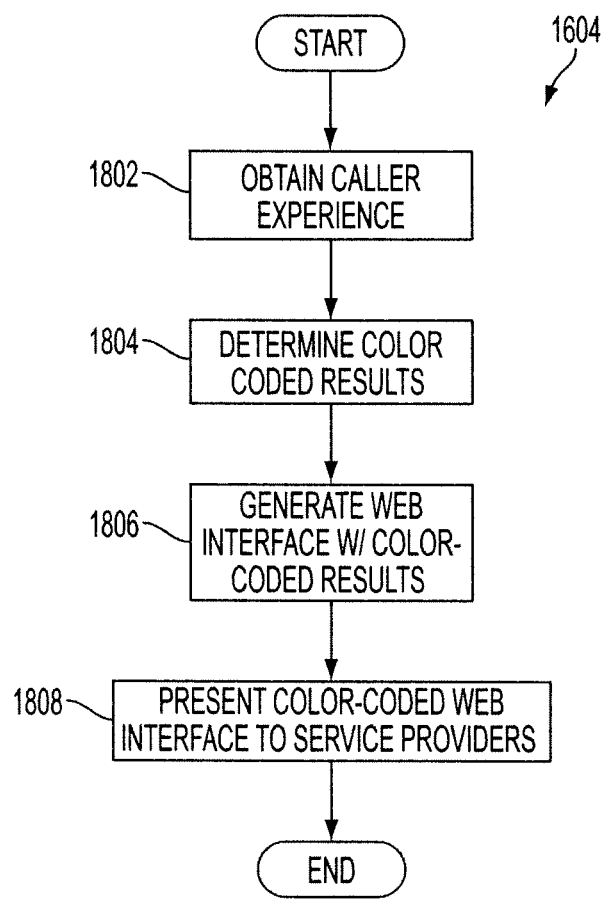
FIG. 18 depicts a flowchart of a process for notifying the service provider of caller experience in accordance with an alternative embodiment of the present disclosure.

Referring to FIG. 18, a flowchart of a process for notifying the service provider of caller experience is depicted in accordance with an alternative embodiment of the present disclosure. In one embodiment, process 1604 may be implemented as instructions embodied in a computer readable medium executing within caller experience monitoring system 126. Process 1604 begins at step 1702 to obtain the caller experience developed using process 600 in FIG. 6.

Next, process 1604 continues to step 1704 to determine the color-coded results based on the caller experience. Process 1604 then continues to step 1806 to generate a Web interface comprising color-coded results. For example, the Web interface may include a list of steps in the call flow and corresponding color-coded results based on their caller experience. Alternatively, the Web interface may include a color-coded call flow similar to FIGS. 8, 13, and 15. Process 1604 then completes at step 1808 to present the color-coded Web interface to the service provider.

Figure 19:
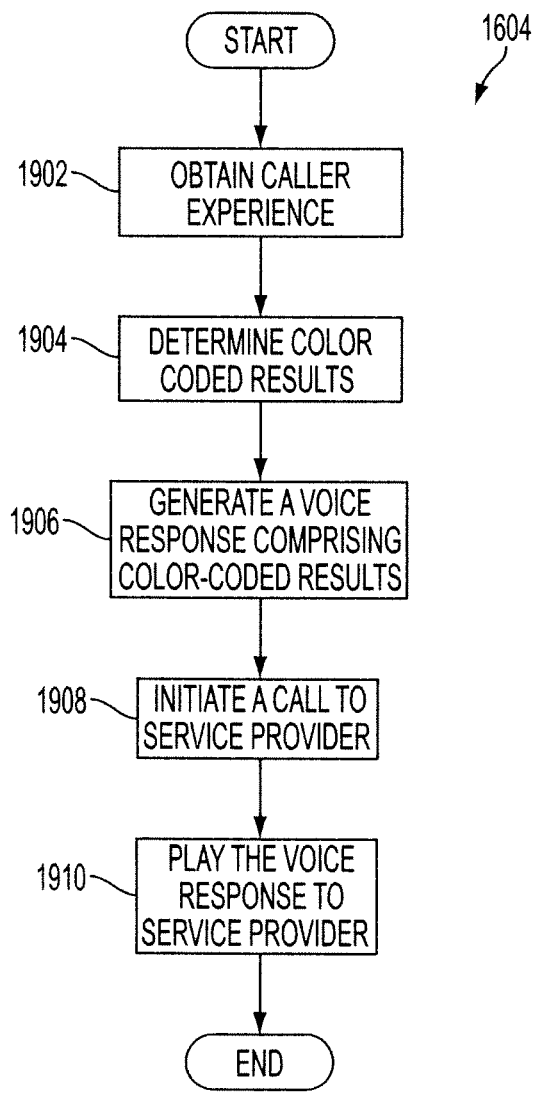
FIG. 19 depicts a flowchart of a process for notifying the service provider of caller experience in accordance with another alternative embodiment of the present disclosure.

Referring to FIG. 19, a flowchart of a process for notifying the service provider of caller experience is depicted in accordance with another alternative embodiment of the present disclosure. In one embodiment, process 1604 may be implemented as instructions embodied in a computer readable medium executing within caller experience monitoring system 126. Process 1604 begins at step 1902 to obtain the caller experience developed using process 600 in FIG. 6.

Next, process 1604 continues to step 1904 to determine color-coded results based on the caller experience. Process 1604 then continues to step 1906 to generate a voice response comprising color-coded results for the service providers. For example, the voice response may comprise options for listening to a list of red color-coded steps or group of steps. Process 1604 then continues to step 1908 to initiate a call to the service provider. Process 1604 then completes at step 1910 to play the voice response to the service provider.

Figure 20:
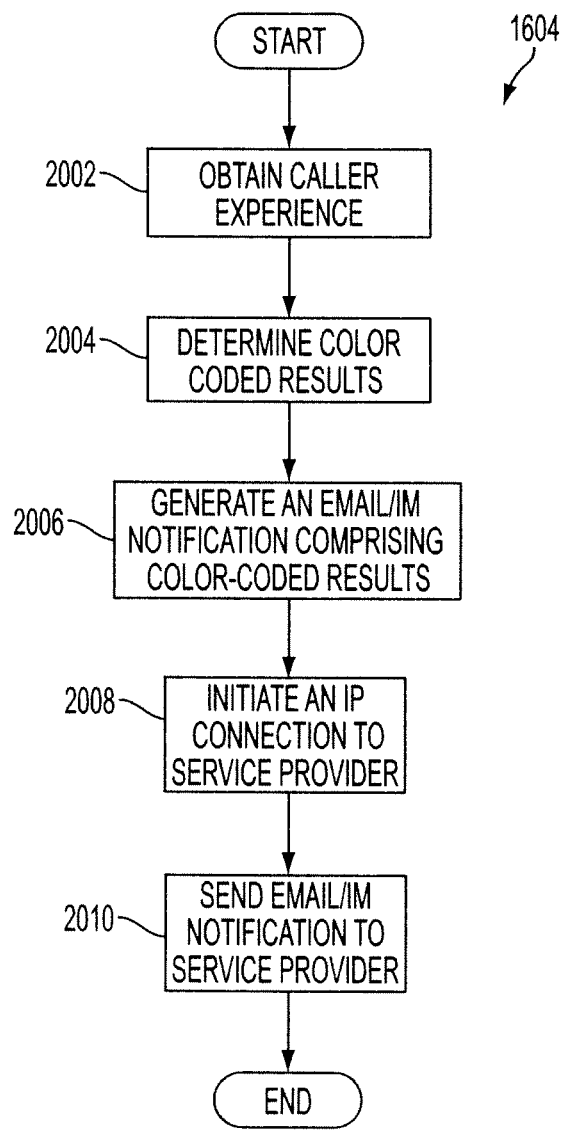
FIG. 20 depicts a flowchart of a process for notifying the service provider of caller experience in accordance with yet another alternative embodiment of the present disclosure.

Referring to FIG. 20, a flowchart of a process for notifying the service provider of caller experience is depicted in accordance with yet another alternative embodiment of the present disclosure. In one embodiment, process 1604 may be implemented as instructions embodied in a computer readable medium executing within caller experience monitoring system 126. Process 1604 begins at step 2002 to obtain caller experience developed using process 600 in FIG. 6.

Next, process 1604 continues to step 2004 to determine color-coded results based on the caller experience. Process 1604 then continues to step 2006 to generate an email or instant message notification comprising the color-coded results. For example, an email comprising a list of red color-coded steps may be generated. Alternatively, an instant message including a list of red color-coding steps and necessary corrective actions may be generated.

Process 1604 then continues to step 2008 to initiate an Internet protocol (IP) connection to the service provider. For example, a new conversation may be initiated in the instant messaging application for the service provider. Once the connection is initiated, process 1604 then completes at step 2010 to send the email or instant message notification comprising the color-coded results to the service provider. For example, an instant message comprising a list of color-coded results may be attached to the conversation notifying the service provider of real time caller experience.

After the service provider is notified, service providers may decide to update the design of the call flow or selection options within the call flow to improve caller experience. In addition, the service provider may decide to modify the monitoring formula to provide a different perspective of the caller experience. An aspect of the present disclosure provides the ability to receive corrective actions from the service provider and implement the corrective actions in the system.

Figure 21:
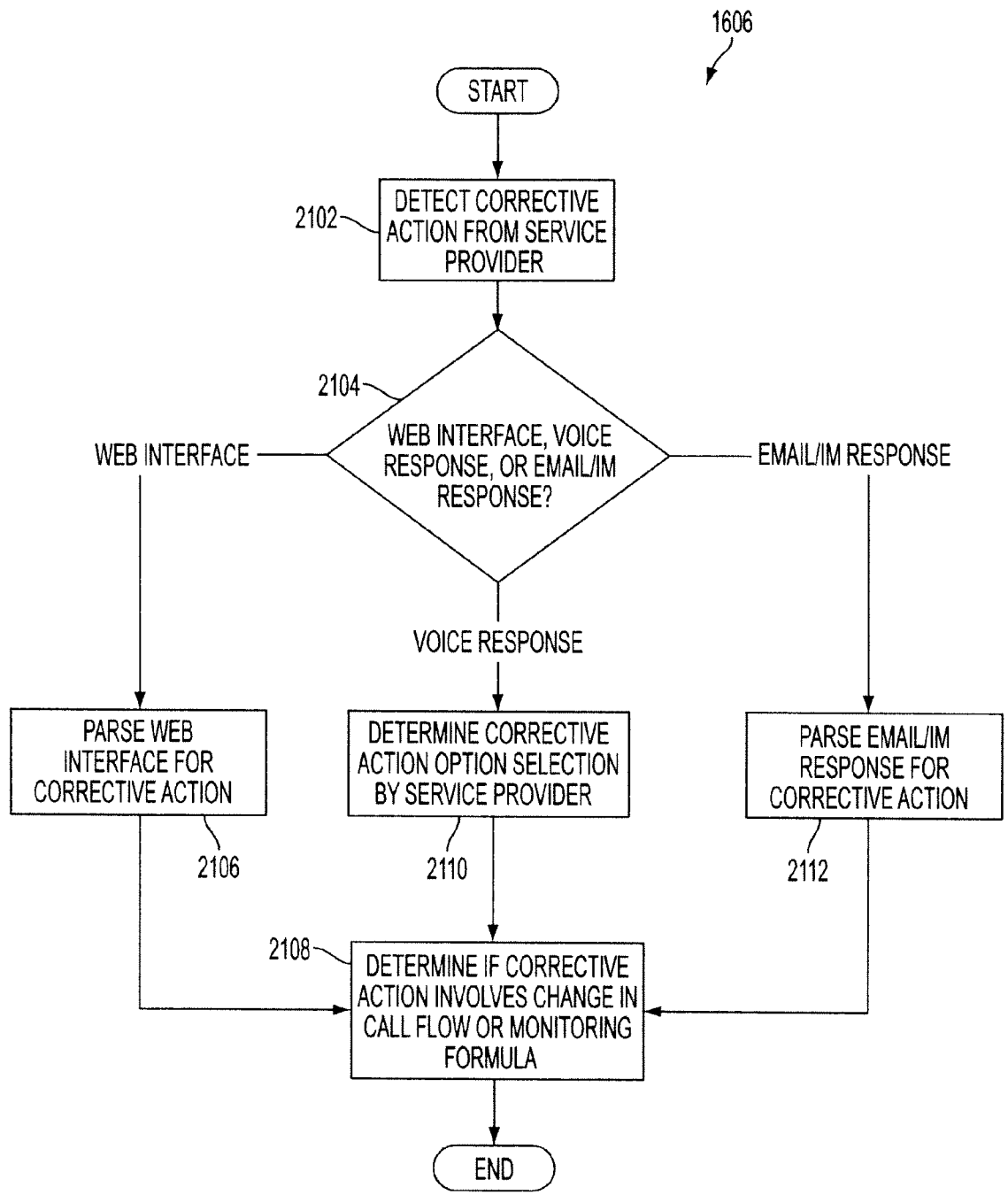
FIG. 21 depicts a flowchart of a process for receiving corrective actions from service providers in accordance with one embodiment of the present disclosure.

Referring to FIG. 21, a flowchart of a process for receiving corrective actions from service providers is depicted in accordance with one embodiment of the present disclosure. In one embodiment, process 1606 may be implemented as instructions embodied in a computer readable medium executing within caller experience monitoring system 126. Process 1606 begins at step 2102 to detect corrective action initiated from the service provider.

Because corrective actions may be sent by the service providers in a variety of ways, process 1606 continues to step 2104 to determine if the corrective actions are sent via a Web interface, a voice response, or an email or instant message notification. If the corrective actions are sent via a Web interface, process 1606 continues to step 2106 to parse the Web interface for the corrective actions. Process 1606 then completes at step 2108 to determine if the corrective action involves changes in the call flow or a monitoring formula.

If the corrective actions are sent via a voice response, process 1606 continues to step 2110 to determine a corrective action selection by the service provider. For example, the voice response may comprise a selection by the service provider to modify a criterion in the monitoring formula or to delete a selection in one of the steps in a call flow. Process 1606 then completes at step 2108 to determine if the corrective action involves changes in call flow or monitoring formula.

If the corrective actions are sent via an email or instant message notification, process 1606 continues to step 2112 to parse the email or instant message notification for the corrective actions. For example, a response in a conversation of an instant message may comprise a selection by the service provider to modify a step in a call flow. Process 1606 then completes at step 2108 to determine if the corrective action involves changes in call flow or monitoring formula.

Figure 22:
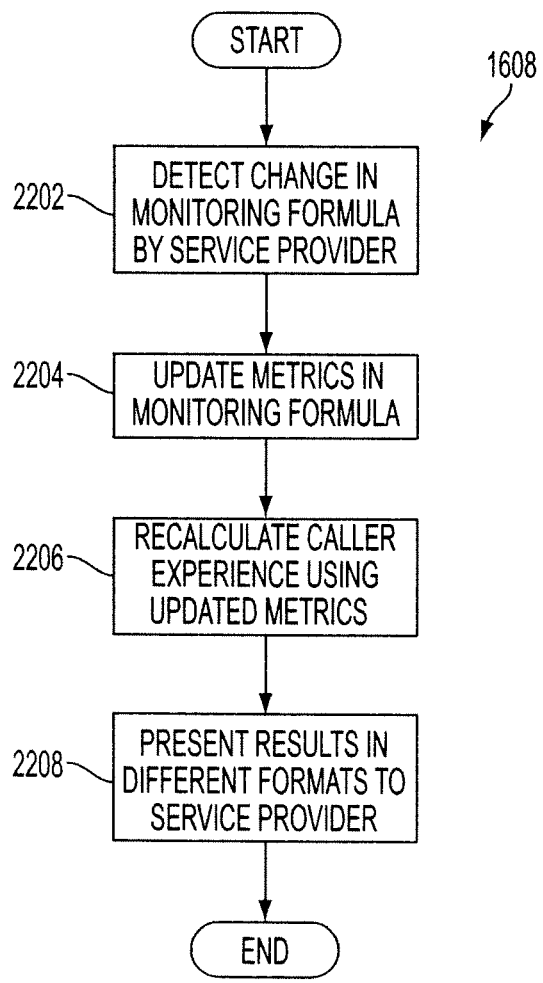
FIG. 22 depicts a flowchart of a process for implementing corrective actions involving a change in the monitoring formula in accordance with one embodiment of the present disclosure.

Once corrective actions are received from the service providers, an aspect of the present disclosure distinguishes from the corrective actions whether a change in the call flow or the monitoring formula is involved and implements the corrective actions accordingly. Referring to FIG. 22, a flowchart of a process for implementing corrective actions involving a change in the monitoring formula is depicted in accordance with one embodiment of the present disclosure. In one embodiment, process 1608 may be implemented as instructions embodied in a computer readable medium executing within caller experience monitoring system 126.

Process 1608 begins at step 2202 to detect a change in the monitoring formula by the service provider. For example, the service provider may modify a percentage of a metric for a particular color-coding. Next, process 1608 continues to step 2204 to update the metrics in the monitoring formula reflecting the change made by the service provider. Process 1608 then continues to step 2206 to recalculate the caller experience using the updated metrics in the monitoring formula. For example, the caller experience may be recalculated using the new percentage of a metric for a particular criterion. Process 1608 then completes at step 2208 to present the results in different formats to the service provider.

Figure 23:
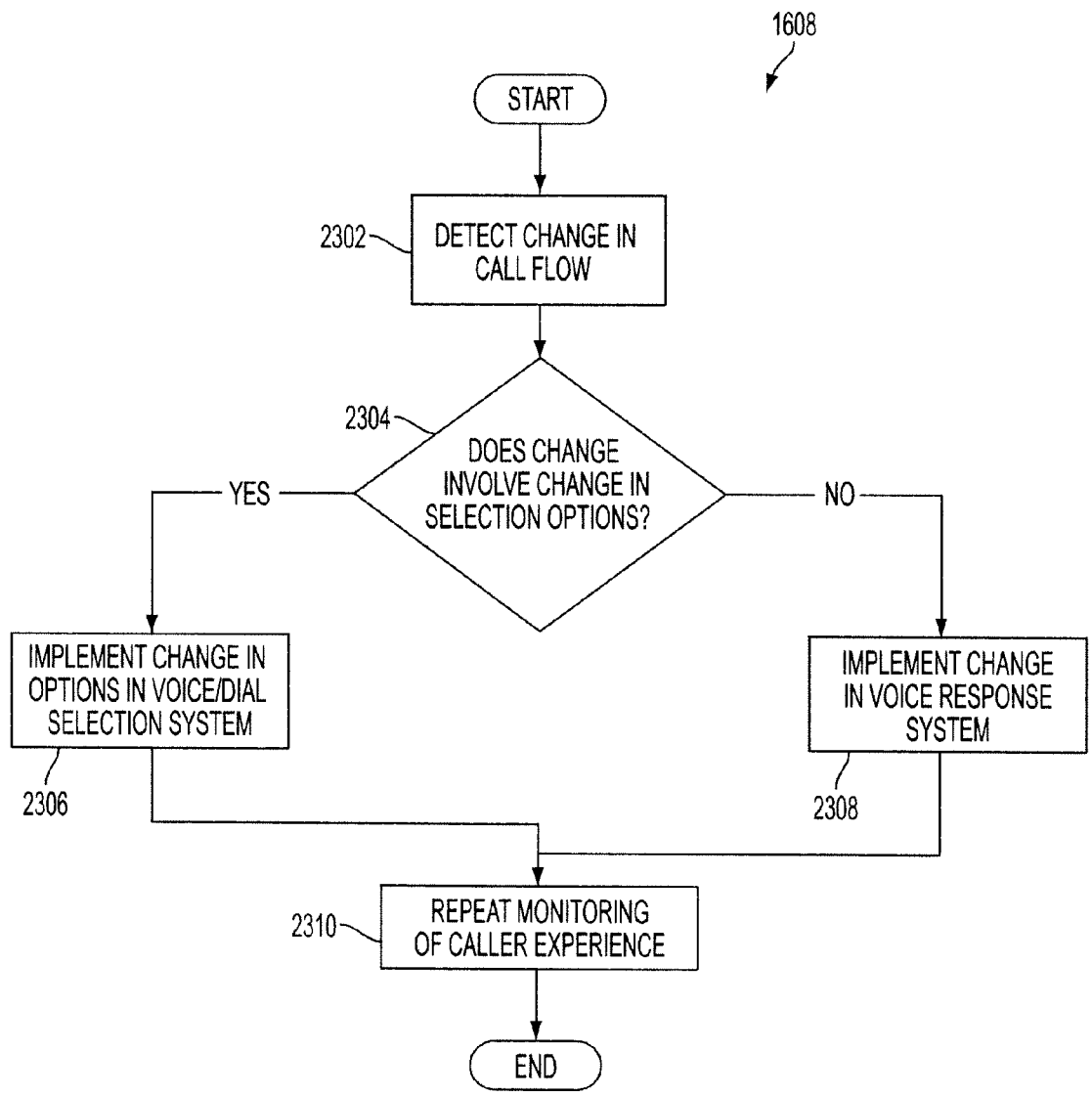
FIG. 23 depicts a flowchart of a process for implementing corrective actions involving a change in the call flow in accordance with one embodiment of the present disclosure.

Referring to FIG. 23, a flowchart of a process for implementing corrective actions involving a change in the call flow is depicted in accordance with one embodiment of the present disclosure. In one embodiment, process 1608 may be implemented as instructions embodied in a computer readable medium executing within caller experience monitoring system 126.

Process 1608 begins at step 2302 to detect a change in the call flow from the corrective actions. Process 1608 then continues to step 2304 to determine if the change in the call flow involves a change in the selection options. For example, a change in the call flow may involve in change in the payment selection option. If the change involves a change in selection options, process 1608 continues to step 2306 to implement the change in selection options in the voice/dial selection system as illustrated in FIG. 1. Process 1608 then completes at step 2310 to repeat real time monitoring of caller experience.

However, if the change in the call flow does not involve a change in selection options, process 1608 then continues to step 2308 to implement the change in the voice response system as illustrated in FIG. 1. For example, a change in the call flow may include a change in the time allowed for a caller to respond to a prompt, such change does not involve a change in selection options but only requires a change in the timeout parameter in the voice response system. Process 1608 then completes at step 2310 to repeat real time monitoring of the caller experience.

Thus, aspects of the present disclosure not only analyze caller experience of a call flow and present results to service providers, aspects of the present disclosure performs real time adjustments for service providers to improve overall caller experience. In one embodiment, the monitoring formula may be adjusted to provide different metrics in measuring caller experience. In an alternative embodiment, steps in the call flow may be adjusted to provide better caller experience, such as faster response and better grammar. With the ability to adjust call flow and monitoring formula at real time, service providers may improve program effectiveness and efficiency without disrupting services to callers.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A method for real time adjustment for better caller experience, the method comprising:
    obtaining caller experience of a call flow;
    notifying a service provider of the caller experience utilizing color codes to determine a level of confusion, misguidance, satisfaction, and dissatisfaction of a caller;
    receiving at least one corrective action from the service provider; and
    implementing the at least one corrective action for better caller experience.

2. The method of claim 1, wherein notifying a service provider of the caller experience comprises:
    obtaining caller experience of at least one step in a call flow;
    determining color-coding of the at least one step based on the caller experience;
    generating a color-coded call flow based on color-coding of the at least one step; and
    presenting the color-coded call flow to the service provider.

3. The method of claim 1, wherein notifying a service provider of the caller experience comprises:
    obtaining caller experience of at least one step in a call flow;
    determining at least one color-coded result based on the caller experience;
    generating a color-coded Web interface comprising the at least one color-coded result; and
    presenting the color-coded Web interface to the service provider.

4. The method of claim 1, wherein notifying a service provider of the caller experience comprises:
    obtaining caller experience of at least one step in a call flow;
    determining at least one color-coded result based on the caller experience;
    generating a voice response comprising the at least one color-coded result;
    initiating a call to the service provider; and
    playing the voice response to the service provider.

5. The method of claim 1, wherein notifying a service provider of the caller experience comprises:
    obtaining caller experience of at least one step in a call flow;
    determining at least one color-coded result based on the caller experience;
    generating a notification comprising the at least one color-coded result;
    initiating an internet protocol connection to the service provider; and
    sending the notification to the service provider via the internet protocol connection.

6. The method of claim 5, wherein the notification is one of an email or an instant message.

7. The method of claim 1, wherein receiving at least one corrective action from the service provider comprises:
    detecting the at least one corrective action from the service provider; and
    determining if the at least one corrective action is sent via a Web interface, a notification by email or instant message, or a voice response.

8. The method of claim 7, further comprising:
    if the at least one corrective action is sent via a Web interface, parsing the Web interface for the at least one corrective action.

9. The method of claim 7, further comprising:
    if the at least one corrective action is sent via a voice response, determining a corrective action selection by the service provider.

10. The method of claim 7, further comprising:
    if the at least one corrective action is sent via a notification by email or instant message, parsing the email or the instant message for the at least one corrective action.

11. The method of claim 7, further comprising:
    determining if the at least one corrective action involves a change in the call flow or a monitoring formula.

12. The method of claim 1, wherein implementing the at least one corrective action for better caller experience comprises:
    detecting a change in a monitoring formula by the service provider;
    updating a set of metrics in the monitoring formula;

recalculating the caller experience using the set of metrics; and presenting the caller experience to the service provider.

13. The method of claim 1, wherein implementing the at least one corrective action for better caller experience comprises:
    detecting a change in at least one step in the call flow; and
    determining if the change involves a change in selection options.

14. The method of claim 13, further comprising:
    if the change involves a change in selection options, implementing the change in at least one selection option in a voice or dial selection system.

15. The method of claim 13, further comprising:
    if the change does not involves a change in selection options, implementing the change in a voice response system.

16. The method of claim 13, further comprising:
    repeating monitoring of caller experience after the change is implemented.

17. A system for real time adjustment for better caller experience comprising:
    a voice response system configured to process at least one call from at least one caller;
    a voice or dial selection system configured to provide at least one selection to the at least one caller;
    a performance tuning system configured to tune performance of the voice response system; and
    a caller experience monitoring system configured to notify a service provider an experience by the at least one caller in a call flow utilizing color codes to determine a level of confusion, misguidance, satisfaction, and dissatisfaction of the at least one caller, and implement the at least one corrective action for better caller experience.

18. The system of claim 17, wherein the caller experience monitoring system is further operable to obtain caller experience of at least one step in the call flow and determine at least one color-coding for the at least one step.

19. The system of claim 18, wherein the caller experience monitoring system is further operable to generate a color-coded call flow comprising the at least one color-coding for the at least one step.

20. The system of claim 18, wherein the caller experience monitoring system is further operable to generate a Web interface comprising the at least one color-coding for the at least one step.

21. The system of claim 18, wherein the caller experience monitoring system is further operable to generate a voice response comprising the at least one color-coding for the at least one step, initiate a call to the service provider, and play the voice response to the service provider.

22. The system of claim 18, wherein the caller experience monitoring system is further operable to generate a notification comprising the at least one color-coding for the at least one step, initiate an internet protocol connection to the service provider, and send the notification to the service provider via the internet protocol connection.

23. The system of claim 22, wherein the notification comprises one of an email or an instant message.

24. The system of claim 17, wherein the caller experience monitoring system is further operable to detect a change in a monitoring formula by the service provider, update a set of metrics in the monitoring formula, recalculate the caller experience using the set of metrics, and present the caller experience to the service provider.

25. A non-transitory computer readable medium comprising instructions for:
    obtaining caller experience of a call flow;
    notifying a service provider of the caller experience utilizing color codes to determine a level of confusion, misguidance, satisfaction, and dissatisfaction of a caller;
    receiving at least one corrective action from the service provider; and
    implementing the at least one corrective action for better caller experience.

26. The non-transitory computer readable medium of claim 25, further comprising instructions for:
    obtaining caller experience of at least one step in the call flow;
    determining color-coding of the at least one step based on the caller experience;
    generating a color-coded call flow based on color-coding of the at least one step; and
    presenting the color-coded call flow to the service provider.

* * * * *